(12) United States Patent
Medasani et al.

(10) Patent No.: US 8,483,478 B1
(45) Date of Patent: Jul. 9, 2013

(54) GRAMMAR-BASED, CUEING METHOD OF OBJECT RECOGNITION, AND A SYSTEM FOR PERFORMING SAME

(75) Inventors: Swarup S. Medasani, Thousand Oaks, CA (US); Yuri Owechko, Newbury Park, CA (US); Thommen Korah, Marina Del Rey, CA (US); Jason Wu, Issaquah, WA (US); Dejan Nikic, Seattle, WA (US)

(73) Assignee: HRL Laboratories, LLC, Malibu, CA (US)

( * ) Notice: Subject to any disclaimer, the term of this patent is extended or adjusted under 35 U.S.C. 154(b) by 732 days.

(21) Appl. No.: 12/685,495

(22) Filed: Jan. 11, 2010

(51) Int. Cl.
*G06K 9/00* (2006.01)
(52) U.S. Cl.
USPC .......................................... 382/154; 382/100
(58) Field of Classification Search
USPC .......................................... 382/115–118, 154
See application file for complete search history.

(56) References Cited

U.S. PATENT DOCUMENTS

| | | | |
|---|---|---|---|
| 7,095,364 B1 * | 8/2006 | Rawdon et al. | 342/120 |
| 2007/0291994 A1 * | 12/2007 | Kelle et al. | 382/110 |
| 2009/0161944 A1 * | 6/2009 | Lau et al. | 382/154 |

* cited by examiner

*Primary Examiner* — Alex Liew
(74) *Attorney, Agent, or Firm* — Ladas & Parry

(57) ABSTRACT

In an embodiment, a grammar-based, cueing method of object recognition is disclosed. The method may include or comprise accessing cells that define a portion of a three-dimensional (3-D) scene, assigning occupation parameters to the cells to define a plurality of occupied cells and at least one vacant cell, and assigning localization parameters to the occupied cells based on the occupation parameters of their respective neighboring cells. The method may further include or comprise characterizing a plurality of the occupied cells as geometric cues based on their respective occupation and localization parameters, and identifying a target geometric shape associated with the geometric cues.

24 Claims, 19 Drawing Sheets

GRAMMAR-BASED, CUEING METHOD OF OBJECT RECOGNITION, AND A SYSTEM FOR PERFORMING SAME

STATEMENT REGARDING FEDERALLY SPONSORED RESEARCH

The invention was developed with support from the United States Government under Contract No. HM1582-07-C-0017 awarded by the National Geospatial-Intelligence Agency. The United States Government has certain rights in the invention.

TECHNICAL FIELD

The present technology relates to the field of object recognition.

BACKGROUND

Many modern computing systems are configured to process data at a high rate of speed, such as to obtain specific information. In the field of digital image processing, a high-speed computing system may be utilized to implement one or more image processing algorithms to obtain, for example, certain information about a digital image and/or a refined version of such image.

SUMMARY

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter.

In an embodiment, a grammar-based, cueing method of object recognition is disclosed. The method may include or comprise accessing cells that define a portion of a three-dimensional (3-D) scene, assigning occupation parameters to the cells to define a plurality of occupied cells and at least one vacant cell, and assigning localization parameters to the occupied cells based on the occupation parameters of their respective neighboring cells. The method may further include or comprise characterizing a plurality of the occupied cells as geometric cues based on their respective occupation and localization parameters, and identifying a target geometric shape associated with the geometric cues.

Additionally, in one embodiment, a grammar-based, cueing method of object recognition is disclosed, wherein the method may include or comprise accessing 3-D data points associated with a 3-D scene and corresponding to different altitude values, and filtering a first group of the 3-D data points corresponding to one or more altitude values above a preselected altitude threshold from a second group of the 3-D data points associated with one or more different altitude values at or below the preselected altitude threshold. The method may further include or comprise identifying a target geometric shape associated with a plurality of data points from among the first group of 3-D data points, and defining an object formed by the plurality of data points as a result of the identifying of the target geometric shape.

Moreover, in an embodiment, a grammar-based, cueing method of object recognition is disclosed, wherein the method may include or comprise defining different geometric resolutions each measured in cells per unit area, and parsing a group of 3-D data points into a first plurality of cells pursuant to a first geometric resolution. The method may also include or comprise assigning occupation parameters to the first plurality of cells to define a first set of occupied cells, and assigning localization parameters to the first set of occupied cells based on the occupation parameters of their respective neighboring cells. The method may further include or comprise characterizing a group of cells from among the first set of occupied cells as a first set of geometric cues based on their respective occupation and localization parameters, and storing the first set of geometric cues.

With reference still to the previous embodiment, the aforementioned method may be further expanded to include or comprise parsing the group of 3-D data points into a second plurality of cells pursuant to a second geometric resolution, assigning occupation parameters to the second plurality of cells to define a second set of occupied cells, and assigning localization parameters to the second set of occupied cells based on the occupation parameters of their respective neighboring cells. The method may also include or comprise characterizing a group of cells from among the second set of occupied cells as a second set of geometric cues based on their respective occupation and localization parameters, and comparing the first and second sets of geometric cues to identify a target geometric shape.

Furthermore, in one embodiment, a system for performing a grammar-based, cueing method of object recognition is disclosed. The system may include or comprise a cueing module configured to access cells that define a portion of a 3-D scene, assign occupation parameters to the cells to define a plurality of occupied cells and at least one vacant cell, and assign localization parameters to the occupied cells based on the occupation parameters of their respective neighboring cells. The system may also include or comprise an integration module communicatively coupled or associated with the cueing module, the integration module being configured to characterize a plurality of the occupied cells as geometric cues based on their respective occupation and localization parameters. The system may further include or comprise a validation module communicatively coupled or associated with the integration module, the validation module being configured to identify a target geometric shape associated with the geometric cues.

DESCRIPTION OF THE DRAWINGS

The accompanying drawings, which are incorporated in and form a part of this specification, illustrate embodiments of the present technology, and, together with the Detailed Description, serve to explain principles discussed below.

Figure 1:
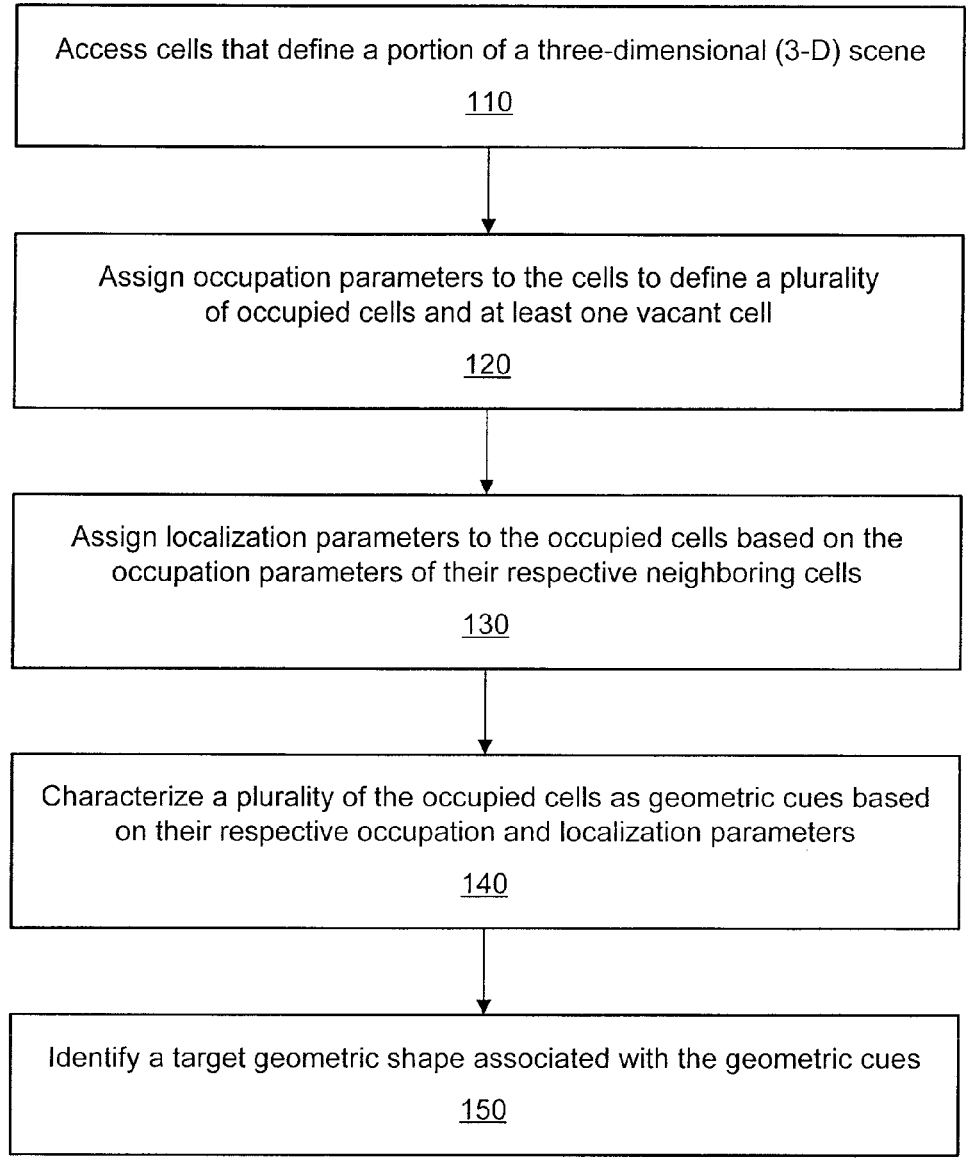
FIG. 1 is a flow chart of a first exemplary grammar-based, cueing method of object recognition in accordance with an embodiment.

The drawings referred to in this description are not to be understood as being drawn to scale except if specifically noted, and such drawings are only exemplary in nature.

DETAILED DESCRIPTION

Reference will now be made in detail to embodiments of the present technology, examples of which are illustrated in the accompanying drawings. While the present technology will be described in conjunction with various embodiments, these embodiments are not intended to limit the present technology. Rather, the present technology is to be understood as encompassing alternatives, modifications and equivalents, which may be included within the spirit and scope of the various embodiments as defined by the appended claims.

Furthermore, in the following Detailed Description numerous specific details are set forth in order to provide a thorough understanding of the present technology. However, the present technology may be practiced without these specific details. In other instances, well-known methods, procedures, components, and circuits have not been described in detail so as to not unnecessarily obscure aspects of the exemplary embodiments presented herein.

Overview

Accurate detection of power lines is useful in several applications such as aerial navigation, collision avoidance, and intelligence acquisition and analysis. For example, the detection of wires, power lines, and power line corridors may be useful to several airborne platforms such that the problem of "wire strikes" may be avoided. A "wire strike" may be defined as an aerial vehicle crashing into a power line that may not be easy to detect.

Thus, a system configured to alert the operator or the control system of a vehicle of the imminent approach to power lines would be a great asset in ensuring the safety of the vehicle, as well as its occupants and cargo. Additionally, intelligence agencies may wish to get a snapshot of a power grid structure that exists in enemy territory. Thus, a system that can rapidly detect and mark the entire power line grid in a region would be of immense value in mission planning and situational awareness.

The detection of power lines is a non-trivial problem due to several factors such as different types of wires, towers, communication cables, etc., poor visibility conditions from dirty windscreens, obscuring effects of terrain and changes in visual perspective that occur during climb and descent. In addition, several of the smaller cables and wires may not be easily and/or effectively detected by sensing modalities like microwave radar or thermal imaging systems.

An exemplary method at power line detection may utilize visual and active aids that are placed near the power lines to alert approaching vehicles. However, typical overhead cables and wires in urban environments are quite small and not detectable by conventional microwave radar. Indeed, the specular nature of the return signal at the microwave frequencies makes detection relatively difficult. Thermal imaging systems may also be inadequate since wires are often at the same temperature as the background or are below the resolution limit of these systems.

In an embodiment of the present technology, a light detection and ranging (LIDAR) sensor is utilized to obtain 3D information about a geographic scene. The collected data is then used to robustly and rapidly detect wire-like objects in the scene.

Indeed, one embodiment of the present technology provides a novel, multi-resolution, grammar-based cueing method for wire detection from LIDAR data. The multi-resolution cueing approach is useful in detecting not just single wires but also power lines and power line corridors. Grammar cueing operators are used to generate tokens or symbols extracted from implicit representations of an input point cloud. The tokenized stream is then parsed using the grammar rules resulting in marked locations that satisfy the wire cue grammar. This approach is relatively fast and can process LIDAR data at a very high rate, 500,000 pts in less than a minute. The robustness of the invention comes from a redundant consistency check that uses a LIDAR intensity signal as well as any available contextual information to mitigate false alarms.

For purposes of clarity, and in accordance with an example, a "grammar-based" cueing method is defined as involving the use of tokens and rules to parse the data and determine the presence of an entity. These tokens are labels assigned to cells (e.g., "AHNEC": axis has no empty cells) based on their neighborhood properties. Once the data is parsed using such tokens, the grammar rules stitch the tokens together, and the presence of a combination of tokens as defined by the grammar reveals the presence of a particular entity. Thus, a grammar-based cueing may involve flagging one or more cells with a label according to a set of rules, wherein the label connotes certain information about those cells. To further illustrate, one flag may indicate that a cell has no adjoining cells with more than a predetermined number of LIDAR data points.

Moreover, an example provides that "implicit representations" are the opposite of explicit data representations, which for 3D data include the actual X, Y and Z coordinate values for the various points. Implicit representations are more like functions on the 3D space where the actual value at any X, Y and Z location may be obtained by looking up the function. Unlike explicit representations, implicit representations can easily handle operations at multiple resolutions, because the cell size used to read the function value can be easily varied.

Examples of implicit functions are population functions and distance functions. A population function may be implemented to return the population of points that fall into the neighborhood of the query location, while the distance function returns the distance of the query location to an object boundary. It is noted that, in accordance with an embodiment of the present technology, a population function is implemented as an implicit representation. The population function parses the 3D space into a number of cells, and each cell stores or contains the population of points that fall within it. This implicit representation is suitable for relatively fast processing and rapidly detecting objects of interest.

Thus, an embodiment provides a novel, multi-resolution, grammar-based power line detection method that is fast, robust, and can reliably extract varying width wires ranging from single strands to power lines and power line corridors. The input data set is from a LIDAR sensor and includes position information (such as coordinates in the X, Y, and Z planes) along with the intensity signal. The use of implicit representations, tokenization of the implicit data, and executing the grammar on the parsed tokens enables rapid processing of the data and accurate detection of the wire cues. The approach has two false alarm mitigation pathways that use complementary information such as the LIDAR intensity signal or contextual information to suppress line segments that have a high probability of being false alarms. Indeed, collected results, such disclosed herein, indicate that embodiments of the present technology are highly effective in detecting the entire power grid in urban areas and can be easily ported into a real-time platform.

It is further noted that embodiments of the present technology are useful for applications that utilize 3D point cloud data generated by LIDAR, time-of-flight imagers, laser scanners, stereo imagers, or other sensors for sensing and automated understanding of 3D environments. For example, future commercial and military vehicles may use LIDAR to enable autonomous driving or flight modes. Embodiments of the present technology may be implemented to allow systems to automatically recognize power lines for aiding in autonomous navigation or discovering the power line grid for mission planning and situational awareness. They may also be used as a safety tool for rotorcraft protection and alerting. Another application is reduction of the workload for humans analyzing LIDAR data of urban regions for military mission planning and surveillance applications. Therefore, embodiments of the present technology are applicable to aircraft and automotive companies, and upcoming new commercial, military, and government applications interested in intelligent 3D sensing systems.

Furthermore, the embodiments of the present technology are not limited to processing LIDAR data. Embodiments of the present technology may be used to process a data set including intensity information and spatial coordinates (e.g., X, Y, Z coordinates) such as radar data and millimeter wave imaging data. Additionally, the technology described herein would be applicable to the detection of objects other than wires, such as through suitable modifications of rules, parameters and grammars. Nor is the technology herein limited to a particular scale or physical dimension.

Thus, various embodiments of the present technology utilize a new sensing modality along with some novel implicit geometry and grammar cueing based methods. The system is enabled by the advent of new sensor technologies, fast grammar-based processing methods, and context-driven validation to mitigate the false alarms.

Various exemplary embodiments of the present technology will now be discussed. It is noted, however, that the present technology is not limited to these exemplary embodiments, and that the present technology also includes obvious variants of the exemplary embodiments and implementations described herein.

EXEMPLARY EMBODIMENTS

With reference now to FIG. 1, a first exemplary grammar-based, cueing method of object recognition 100 in accordance with an embodiment is shown. Method 100 includes accessing cells that define a portion of a 3-D scene 110, wherein such cells may be defined as individual units of space that may contain a number of data points from an input point cloud. Method 100 also includes assigning occupation parameters to the cells to define a plurality of occupied cells and at least one vacant cell 120, and assigning localization parameters to the occupied cells based on the occupation parameters of their respective neighboring cells 130. Method 100 further includes characterizing a plurality of the occupied cells as geometric cues based on their respective occupation and localization parameters 140, and identifying a target geometric shape associated with the geometric cues 150. Moreover, in an embodiment, method 100 also includes defining an object formed by the plurality of occupied cells as a result of the identifying of the target geometric shape.

Thus, in an embodiment, a method is provided for identifying a particular geometric shape using a number of geometric cues. It is noted, however, that the present technology is not limited to any particular implementation of method 100. To illustrate various exemplary principles of the present technology, however, reference will now be made to FIG. 2, wherein an exemplary object recognition system 200 in accordance with an embodiment is shown.

As will be discussed in further detail herein, exemplary object recognition system 200 includes acquiring an input point cloud 210 which includes a number of 3-D data points that define discrete points in a portion of a 3-D scene. Input point cloud 210 is first passed to a cueing module 220, such as a multi-resolution wire cueing module, wherein a cueing process, such as a multi-resolution wire cueing process, is implemented to parse input point cloud 210 into a plurality of data cells, assign occupation and localization parameters to the parsed data cells, and evaluate the cells based on the assigned parameters to identify a number of these cells as cues for a subsequent shape identification process. Cueing module 220 may also generate wire cue markings at different resolutions, as will be explained in further detail herein. Thus, it is noted that cueing module 220 provides contextual information that may be utilized to evaluate the possibility of various cues being a part of an object of interest, such as a linear object that represents a telephone wire in the 3-D scene.

Next, an integration module 230 is implemented to integrate the generated cues into a shape of interest. For example, if linear objects are of interest, such as where method 100 is being implemented to identify a number of power lines in a geographic area, integration module 230 is utilized to integrate cues into linear objects, wherein such linear objects may represent various power lines in a scanned geographic scene. This integration process will be further explored herein.

To minimize false positives, exemplary object recognition system 200 also includes a validation module 240 configured to determine if a particular grouping of cues, as identified by integration module 230 based on a geometric shape associated with such grouping, is to be identified as a specific object of interest.

To illustrate, it is noted that power lines reflect LIDAR signals differently from their surroundings and hence have a specific intensity response. Thus, in an embodiment, exemplary object recognition system 200 includes a filtering module 250 configured to filter one or more LIDAR intensity signals 211 associated with input point cloud 210 and generate one or more filtered LIDAR intensity signals 251 to be forwarded to validation module 240. For example, filtering module 250 is configured to filter the data points of input point cloud 210 based on their respective LIDAR intensity signals, which were obtained during a scanning of a geographic area with a LIDAR sensor. The filtered data points are then compared with the data cues by validation module 240 to determine which cues are or are not likely to be associated with a target object. While it may not be feasible to use the power line response to filter out all the other objects in a scene, it provides a good signal for validation of the detected power line objects. In particular, the LIDAR intensity signal from input point cloud 210 is filtered to preserve points that have power line like intensity responses, which may be quantified and compared to a preselected intensity threshold associated with an intensity response corresponding to a known power line.

The foregoing notwithstanding, in an embodiment, exemplary object recognition system 200 includes a number of automatic feature extraction tools 260 configured to extract known information about a geometric area from a knowledge database 261. Such information may include known identities and locations of various objects within a specific geometric area, such as trees and buildings. This contextual information is then compared by validation module 240 with the data output from integration module 230 to determine, for example, that a recognized shape associated with a grouping of cues is not to be categorized as an object of interest because of an apparent conflict regarding the positioning of such cues and the known positioning data that was obtained by automatic feature extraction tools 260 from knowledge database 261.

Thus, pursuant to an exemplary implementation, automatic feature extraction tools 260 are implemented to run on the input point cloud to detect, for example, buildings and trees. Validation module 240 then fuses both the intensity signal and the contextual information and ensures that the detected objects, such as a number of linear segments that may represent power lines in a scene, are not false alarms stemming from buildings or vegetation. In this manner, an embodiment incorporates a redundant consistency check that uses a LIDAR intensity signal as well as available contextual information to mitigate false alarms, which serves to increase the robustness and effectiveness of the present technology.

Figure 2:
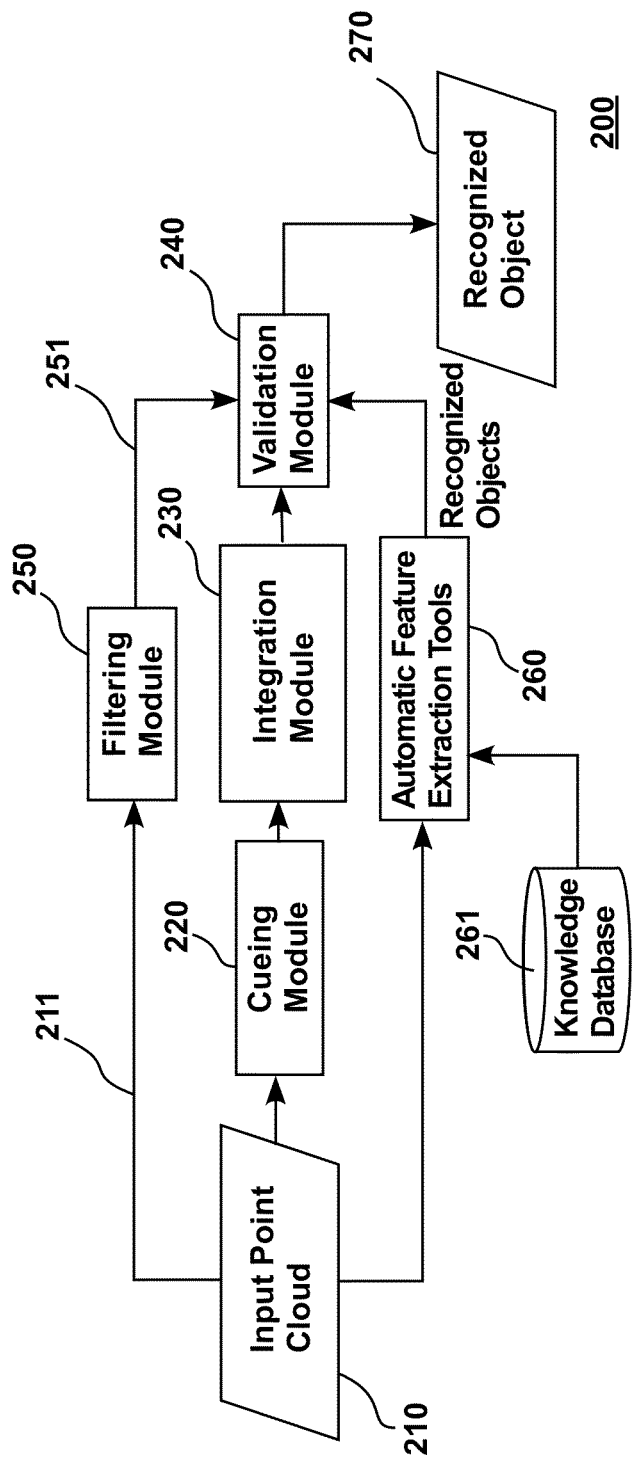
FIG. 2 is a block diagram of an exemplary object recognition system in accordance with an embodiment.

With reference still to FIG. 2, once a grouping of cues has been validated by validation module 240, the validated group of cues is output as a recognized object 270, such as by converting the group of cues into a line format. For example, once a group of cues has been determined to represent a power line in a particular geographic area, the size and positioning of the identified power line is saved into memory and/or output to a user. Thus, in the event that the objects of interest are linear segments, such as when the process is being used to identify power lines in a scene, the surviving linear segments are converted into line object reports.

Hence, FIG. 2 illustrates an exemplary object recognition system 200 that may be utilized to implement method 100. However, for purposes of further illustration, various exemplary implementations of method 100 will now be discussed. It is noted that while these examples may be implemented in accordance with principles of the present technology, the present technology is not limited to these specific examples.

Data Acquisition

As previously stated, method 100 involves accessing cells that define a portion of a 3-D scene 110. In an embodiment, these cells are stored in a memory device, such as a computer-readable medium, after they are generated. In this manner, these cells may be accessed from this memory device subsequent to their generation. However, in one embodiment, method 100 also involves generating these cells.

For example, in an embodiment, method 100 includes utilizing a sensor to scan a geographical area and return data values corresponding to the geographical area. Method 100 also includes generating 3-D data points that define discrete points in a portion of a 3-D scene based on the returned data values. In this manner, a group of 3-D data points, which may be collectively referred to as input point cloud 210 in FIG. 2, are generated such that the resulting 3-D scene is an electronic representation of a scanned geographical area.

It is noted that various different types of sensors may be implemented in accordance with the present technology. Indeed, although the present technology is not limited to the implementation of any specific type of sensor device, pursuant to one example, this sensor may be selected from among a group of scanning devices consisting essentially of a LIDAR sensor, a laser scanner and a stereo imager.

Cueing: Parsing

Furthermore, an embodiment provides that method 100 also includes parsing the 3-D data points to define the aforementioned cells, wherein each of the cells includes a plurality of the 3-D data points associated with one or more altitude values and one or more signal amplitudes. In this manner, the 3-D scene is fragmented such that the resulting cells may be processed based on these altitude values and/or signal amplitudes or just the occupancy of the cells.

Figure 3:
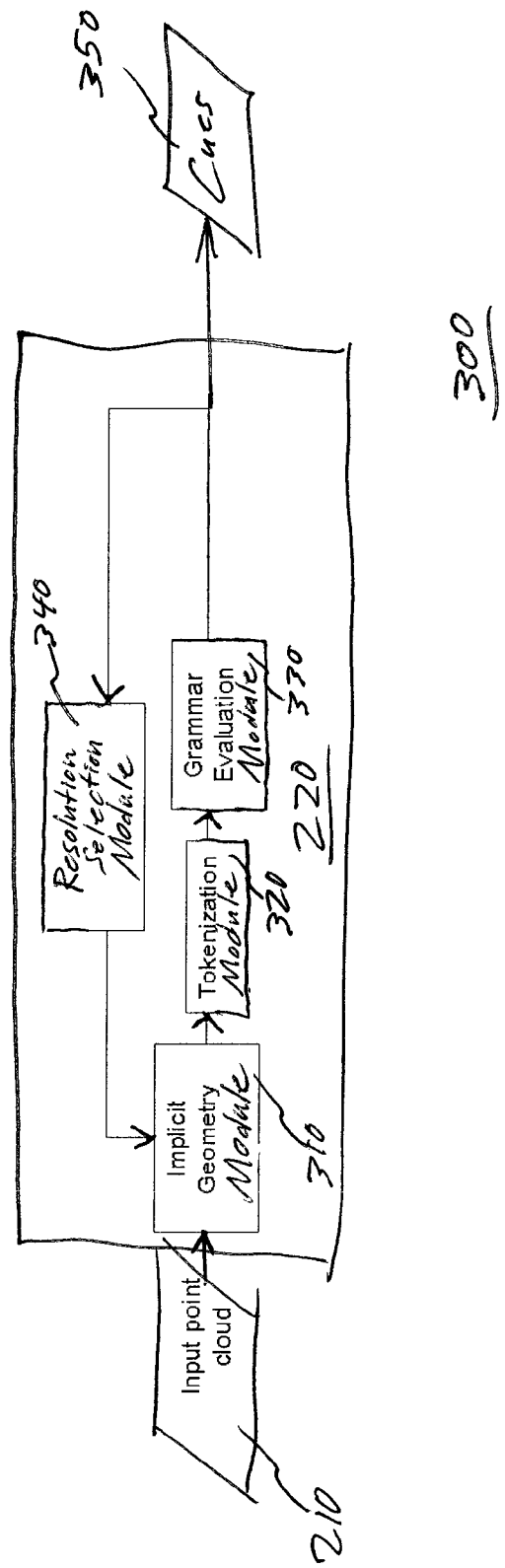
FIG. 3 is a block diagram of an exemplary cueing system in accordance with an embodiment.

To illustrate, and with reference now to FIG. 3, an exemplary cueing system 300 in accordance with an embodiment is shown. In particular, cueing module 220 includes an implicit geometry module 310 configured to implement an implicit geometry generation process so as to convert input point cloud 210 into an implicit geometry representation by partitioning the observed region into a 3D mesh with reasonable resolution, which may be user-defined. In so much as each data point corresponds to a specific position in a 3-D space, as defined by its respective coordinates in the X, Y and Z planes, each data point will be associated with a particular altitude value in that 3-D space with respect to a ground plane therein. Furthermore, in so much as different surfaces and types of materials will reflect light (such as where a LIDAR sensor or a laser scanner is implemented) and/or sound (such as where a stereo imager is implemented) at different signal intensities, each data point will also be associated with a particular signal amplitude based on the intensity of the reflected light and/or sound associated with such data point. Accordingly, when the collected data points are parsed into a plurality of different cells during the fragmentation process, each of the resulting cells will include a number of different data points associated with one or more altitude values and one or more signal amplitudes. As will be further discussed herein, the cells may then be processed based on the altitude values and signal amplitudes of their respective data points during an implemented cueing process.

With reference still to FIG. 3, after implicit geometry module 310 parses input point cloud 210 into a plurality of different data cells, implicit geometry module 310 assigns an implicit geometry value to each cell in the mesh based on various functions, which define the relationship between cells and data points within and outside the cell. In particular, each cell is assigned an occupation parameter such that the cell is characterized as being either "occupied" or "vacant". It is noted that an "occupied" cell essentially means that the cell's implicit geometry-value is greater than a threshold.

Thus, in accordance with an embodiment, method 100 includes defining implicit geometry values associated with the parsed cells, and assigning an occupation parameter to each of the cells based on the cell's respective implicit geometry value to define the cell as occupied or vacant. It is noted that these defined values may be based, for example, on altitude values and/or signal amplitudes associated with the cells. For example, in an embodiment, method 100 also includes defining an implicit geometry value associated with each cell by counting a number of 3-D data points within the cell that are associated with one or more altitude values equal to or above a preselected altitude threshold. Moreover, in one embodiment, method 100 involves defining an implicit geometry value associated with each cell by evaluating one or more signal amplitudes associated with 3-D data points within the cell to determine whether one or more of such signal amplitudes are equal to or above a preselected intensity threshold.

To further illustrate, each of the cells generated by implicit geometry module 310 includes a number of 3-D data points each associated with a specific altitude within the mapped scene. In an embodiment, the altitudes of the various data points are compared to a preselected altitude threshold to determine how many of such data points are above such altitude threshold. Next, the cell is categorized as "occupied" if the number of data points within the cell associated with altitudes above the implemented altitude threshold is equal to or greater than a numerical threshold. If, however, the number of such data points is less than the implemented numerical threshold, the cell is instead categorized as "vacant".

The foregoing notwithstanding, in one embodiment, the implicit geometry generation process is based on the signal intensities associated with the 3-D data points within the various cells. For example, each of the cells generated by implicit geometry module 310 includes a number of 3-D data points each associated with a specific signal intensity, such as the intensity of a LIDAR signal obtained from an implemented sensor device. In an embodiment, the signal intensities of the various data points are compared to a preselected intensity threshold to determine how many of such data points are associated with signal intensities above such intensity threshold. Next, the cell is categorized as "occupied" if the number of data points within the cell associated with signal intensities above the implemented intensity threshold is equal to or greater than a numerical threshold. If, however, the number of such data points is less than the implemented numerical threshold, the cell is instead categorized as "vacant".

Furthermore, in an embodiment, the implicit geometry generation process is based on both the signal intensities and altitude values associated with the 3-D data points within the various cells. For example, the signal intensities and altitude values of the various data points are compared to preselected intensity and altitude thresholds, respectively, to determine how many of such data points are associated with signal intensities and altitudes above such intensity and altitude thresholds, respectively. Next, the cell is categorized as "occupied" if the number of data points within the cell associated with signal intensities and/or altitudes above the implemented intensity and altitude thresholds, respectively, is equal to or greater than a numerical threshold. If, however, the number of such data points is less than the implemented numerical threshold, the cell is instead categorized as "vacant".

Cueing: Tokenization/Grammar Evaluation

With reference still to the embodiment shown in FIG. 3, a tokenization module 320 is implemented to parse the implicit geometry representation into manageable tokens prior to a subsequent grammar evaluation performed by a grammar evaluation module 330. In particular, based on the distribution of occupied cells and the tokens returned during the tokenization process, a set of rules, called a grammar, is defined to cue the objects of interest in the observed space. In an embodiment, the cueing grammar contains a sequence of token verifications before marking an inquired cell as a cue. In particular, and as will be described in relation to FIG. 5, there are three input parameters for the grammar: a lower bound ($\phi$) and an upper bound ($\chi$) of occupied surrounding cells, as well as a height factor ($\psi$). The grammar will examine a collection of 3×3 cell blocks in the x-y plane of the parsed scene, wherein the inquired cell is the center cell of the middle block.

It is noted that different tokenization processes may be implemented in accordance with the present technology. Pursuant to one embodiment, for each inquired cell, the following rules are executed by tokenization module 320 in order until a token is returned:

1. If the cell is empty, token "AHAEC" (axis has an empty cell) is returned.
2. If there is one occupied cell in the far neighborhood, token "NHAOC" (neighborhood has an occupied cell) is returned.
3. If the number of occupied cells in group 2 falls outside the [$\phi,\chi$] interval, token "NHAOC" is returned.
4. Project group 2 cells onto an x-y plane resulting in a perimeter group with 8 cells (located adjacent to the subject cell in the following directions within the plane, respectively: north, northeast, east, south, southeast, southwest, west and northwest); if the perimeter does not contain exactly two separated occupied regions, token "NHAOC" is returned.
5. Otherwise, token "NHNOC" (neighborhood has no occupied cells) is returned, and the inquired cell is marked as a wire cue.

Next, grammar evaluation module 330 is implemented to perform a grammar evaluation and output a number of cues 350. As noted above, the grammar will examine a collection of 3×3 cell blocks in the x-y plane of the parsed scene, wherein the inquired cell is the center cell of the middle block. For example, for wire cueing, the grammar will check the pattern of occupied cells in two types of surrounding neighborhoods of the inquired cell: a near neighborhood associated with the inquired cell as well as far neighborhoods associated with such cell. In an embodiment, the boundaries of these neighborhoods are measured in a vertical direction and with user-defined distances.

It is noted that different grammar evaluation processes may be implemented in accordance with the present technology. Pursuant to one exemplary implementation, grammar evaluation module 330 is configured to mark a cell as a wire cue if the following conditions, or rules, are satisfied:

1. The inquired cell is occupied;
2. There is no occupied cell in the upper and lower far neighborhoods;
3. In the near neighborhood, the number of occupied cells is within acceptable (user-defined) range; and
4. In the near neighborhood, the distribution of occupied cells forms exactly two separated non-occupied regions in the near neighborhood.

Furthermore, this process is looped so as to be applied to each of the cells in the implicit geometry mesh. Indeed, in an embodiment, either grammar evaluation module 330 or an optional resolution selection module 340 is configured to vary the implemented resolution of cueing module 220 such that the cueing process may be repeated.

With reference to the specific grammar rules utilized in the previous embodiment, it is noted that these rules mimic a human's judgment of the existence of wires. Rule 2 checks to determine that there is no obstacle above or below the potential wire. Rules 1, 3, and 4 check to determine if there is a group of occupied cells that clearly cut or separate the near neighborhood into two regions, such as wires running through a small area. It is further noted that the same wire cueing grammar may be applied to a sequence of implicit geometry with various resolutions resulting in aggregated cues for objects like power lines with multiple cables/wires.

Figure 4:
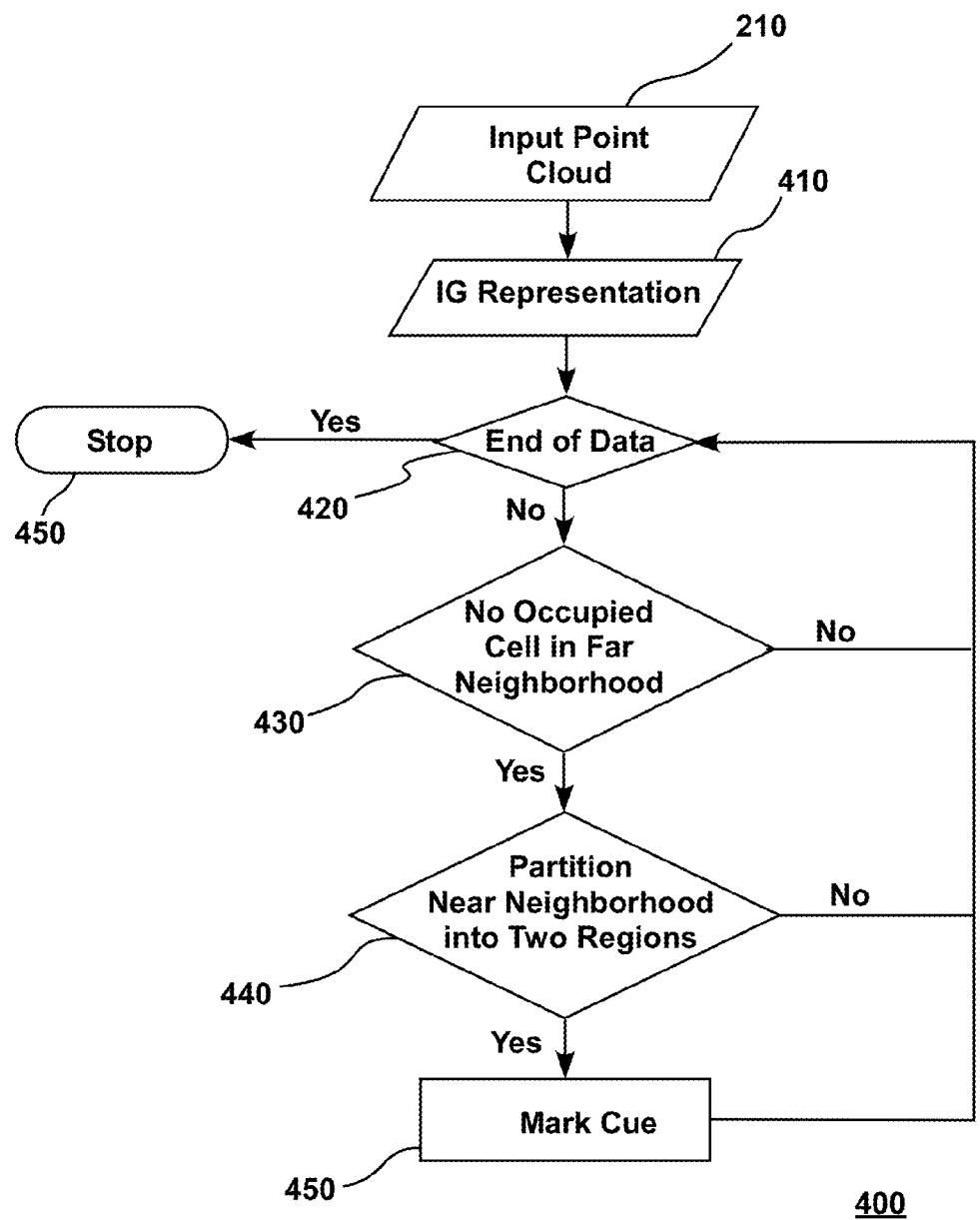
FIG. 4 is a flow chart of an exemplary grammar evaluation process in accordance with an embodiment.

To further illustrate, and with reference now to FIG. 4, an exemplary grammar evaluation process 400 in accordance with an embodiment is shown. Exemplary grammar evaluation process 400 includes parsing input point cloud 210, which includes a number of 3-D data points, into a plurality of cells, as previously described, to generate an implicit geometry (IG) representation 410 of the accessed data. Moreover, exemplary grammar evaluation process 400 includes first, second and third data evaluations 420, 430, 440. During first data evaluation 420, it is determined whether the last cell of IG representation 410 has been processed during the implemented grammar evaluation. If not, an iteration of the process begins so as to determine if any cells in the far neighborhood of the inquired cell are occupied during second data evaluation 430, and if the inquired cell's near neighborhood is partitioned into two, distinct regions during third data evaluation 440. If the answer to both of these inquiries is in the affirmative, the inquired cell is marked as a cue at 450. It is noted that subsequent iterations of the cueing process are performed until the last cell of IG representation 410 has been processed, at which time the cueing process is halted at 460.

In one embodiment, the wire cueing grammar contains a sequence of token verifications before marking an inquired IG cell as a wire cue. The wire cueing grammar is applied to all the cells except those in the margin area (1 offset cell in the x and y directions and w offset cells in the z direction). The grammar will examine a collection of 3×3 cell blocks in the x-y plane where the inquired cell is the center cell of the middle block. The neighborhood cells are partitioned into three groups:

1. cells directly above and below (2 cells total),
2. cells connected to the inquired cell by face, edge, and corner, except for cells in group 1 (24 cells total),
3. cells in the far neighborhood, which are above and below group 2 with $\psi$-1 layers ($2\times(\psi-1)\times9$ cells total).

Figure 5:
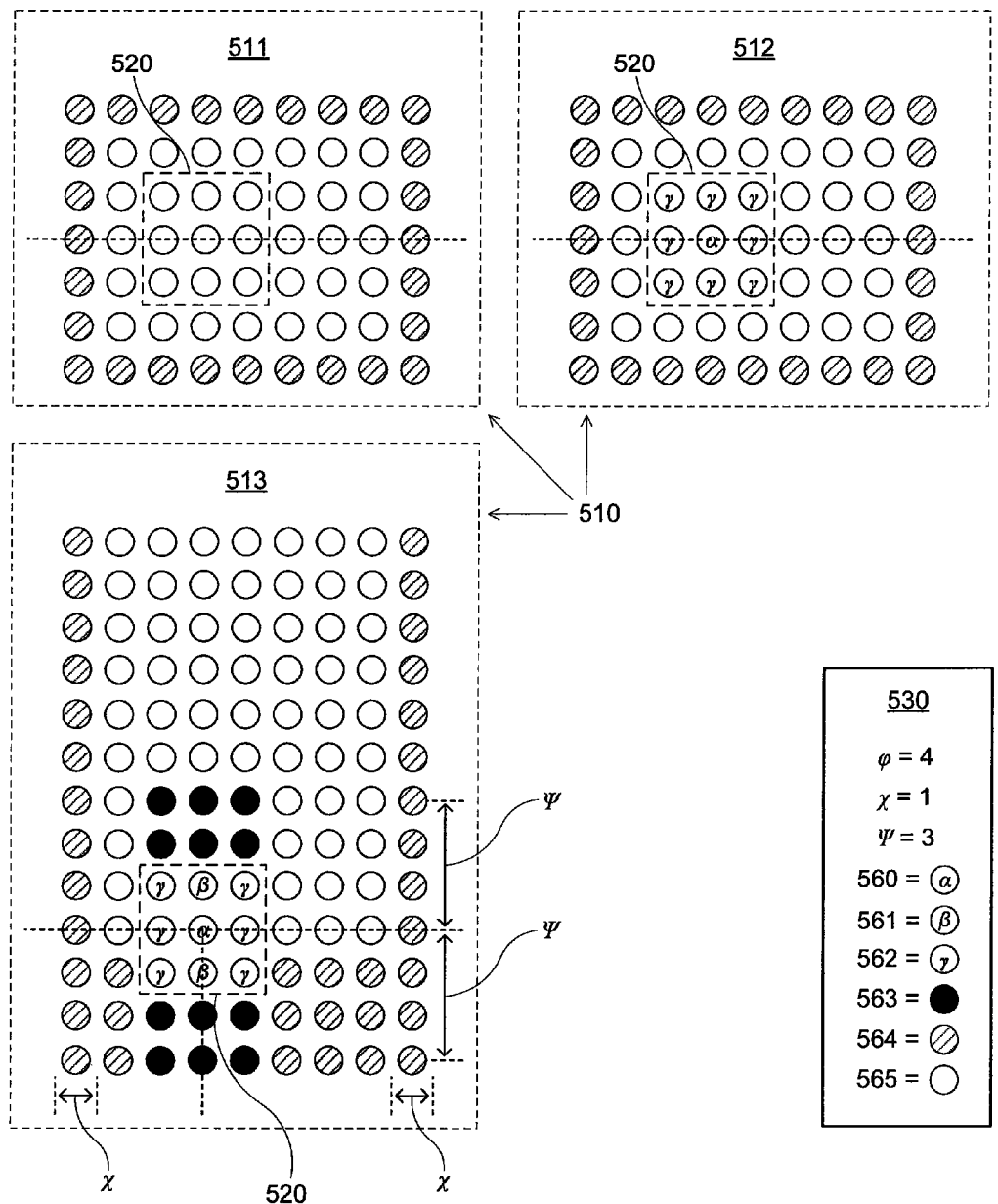
FIG. 5 is a diagram of an exemplary grammar evaluation paradigm in accordance with an embodiment.

With reference now to FIG. 5, an exemplary grammar evaluation paradigm 500 in accordance with an embodiment is shown. In particular, different views of a number of cells in a scene are shown, wherein the cells are represented (for simplicity of illustration) by the illustrated circles which form a cell matrix 510. With reference to the cell matrix, a top view of all samples in the implicit geometry 511, a cross-sectional view of samples at X-Y plane Q 512, and a cross-sectional view of samples at X-Z plane P 513 are illustrated, wherein various cell groupings of interest 520 are shown within the different views of the cell matrix.

It is noted that FIG. 5 illustrates an example of the tokens used and the logic employed to find wire cues pursuant to an exemplary implementation, wherein parameters $\phi$, $\chi$ and $\psi$ are determined empirically and listed in key 530 to be 4, 1 and 3, respectively. Moreover, for purposes of illustrating the exemplary grammar evaluation implemented in FIG. 5, and with reference to key 530, the cells have been illustrated as follows: a cue request population sampling point 560, other points 561 located on a same axis as sampling point 560, side neighborhood points 562, top/bottom neighborhood points 563, non-cueable points 564 located within margins, and other (unused) population sampling points 565. With respect to top/bottom neighborhood points 563, it is noted that no upper margin has been implemented, and that cells beyond these points are assumed to be unoccupied.

With respect to the wire criterion shown in FIG. 5, it is noted that the other axis points and top/bottom neighborhood are unoccupied. It is further noted that there are between "2" and "2+$\phi$" occupied samples in the side neighborhood, and that the x-y projected occupation of the side neighborhood samples (which form an 8 cell ring similar to a domino having 8 points arranged in a substantially square configuration). Furthermore, as may be ascertained from cell groupings of interest 520 within the different views of cell matrix 510, it is noted that the side neighborhood contains 24 samples, and that the top/bottom neighborhood contains 18*($\psi$-1) samples. Again, it is noted that no upper margin has been implemented, and that cells beyond the top/bottom neighborhoods are assumed to be unoccupied.

Thus, FIG. 5 illustrates exemplary logic for detecting wire segments and listing of the parameters involved. This is a relatively simple analysis and utilizes a relatively minimal degree of processing. In an embodiment, markings (e.g. a slime trail) are left on or associated with the points qualified as belonging to a wire cue condition at each resolution chosen. Then, a subsequent re-sampling of the implicit geometry defined by the marked points is executed.

Thus, in an embodiment, method 100 includes associating a near neighborhood and a plurality of far neighborhoods with a subject cell from among the cells, performing a grammar evaluation of the subject cell based on the occupation parameters of the subject cell and each cell within the near and far neighborhoods, and determining whether the subject cell is to be characterized as a geometric cue based on the grammar evaluation.

Indeed, in an embodiment, the performing of the grammar evaluation includes: determining whether a subject cell from among the cells is occupied, determining whether every cell within two juxtaposed neighborhoods from among the far neighborhoods are vacant, evaluating a total number of occupied cells within the near neighborhood, determining whether the near neighborhood includes two or more separated vacant regions, and characterizing the subject cell as a geometric cue if:

1) the subject cell is occupied;
2) every cell within the two juxtaposed neighborhoods is vacant;
3) the total number of occupied cells within the near neighborhood is within a preselected range; and
4) the near neighborhood includes two or more separated vacant regions.

Cueing: Altitude-Based Filtering

Figure 6:
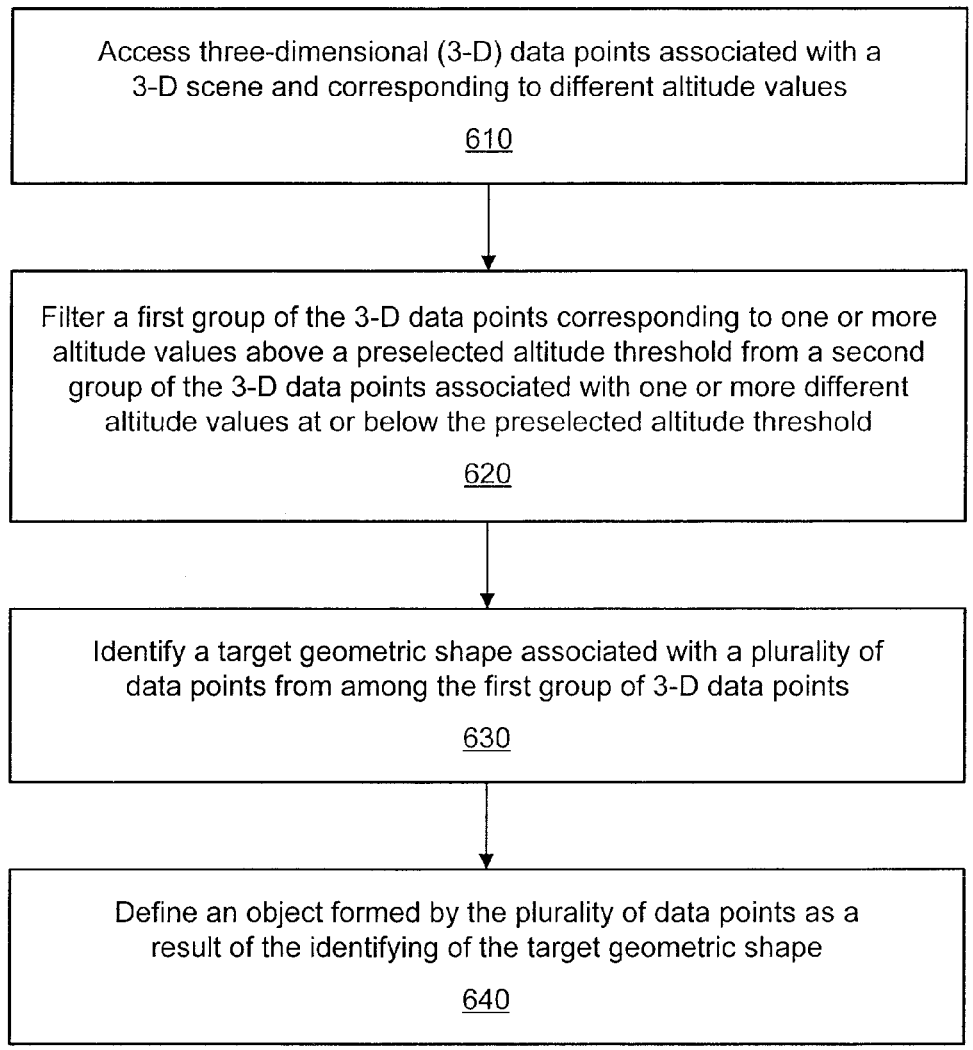
FIG. 6 is a flow chart of a second exemplary grammar-based, cueing method of object recognition in accordance with an embodiment.

As previously explained, an embodiment provides a method of recognizing objects based on the altitude values associated with data points of the various cells of a scene. To further illustrate this concept, and with reference now to FIG. 6, a second exemplary grammar-based, cueing method of object recognition 600 in accordance with an embodiment is shown. Method 600 includes accessing 3-D data points associated with a 3-D scene and corresponding to different altitude values, filtering a first group of the 3-D data points corresponding to one or more altitude values above a preselected altitude threshold from a second group of the 3-D data points associated with one or more different altitude values at or below the preselected altitude threshold, identifying a target geometric shape associated with a plurality of data points from among the first group of 3-D data points, and defining an object formed by the plurality of data points as a result of the identifying of the target geometric shape.

Thus, method 600 involves a simplified methodology of object recognition based on the altitude values of the various data points in a 3-D space. It is noted, however, that method 600 may be expanded to also include the analysis of signal intensities corresponding to these various data points, as previously explained herein.

Cueing: Multiple Resolutions

With reference again to FIG. 3, and in accordance with an embodiment, after the grammar evaluation has been executed, a resolution variation is performed by resolution selection module 340 to vary the implemented resolution of cueing process 220, and cueing process 220 is then repeated at a different resolution.

Figure 7A:
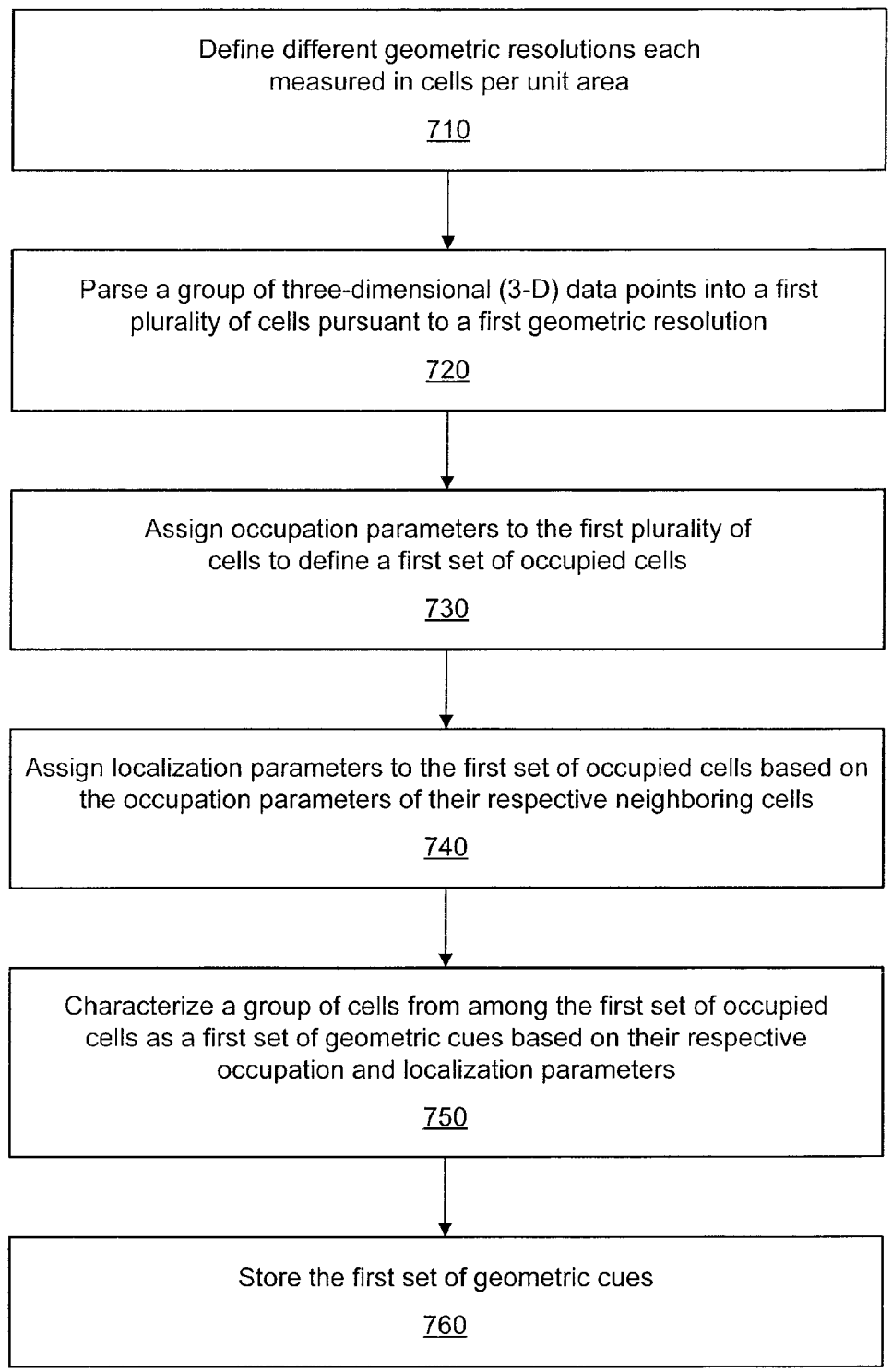
FIGS. 7A-B are flow charts of first and second iterations of a third exemplary grammar-based, cueing method of object recognition in accordance with an embodiment.
Figure 7B:
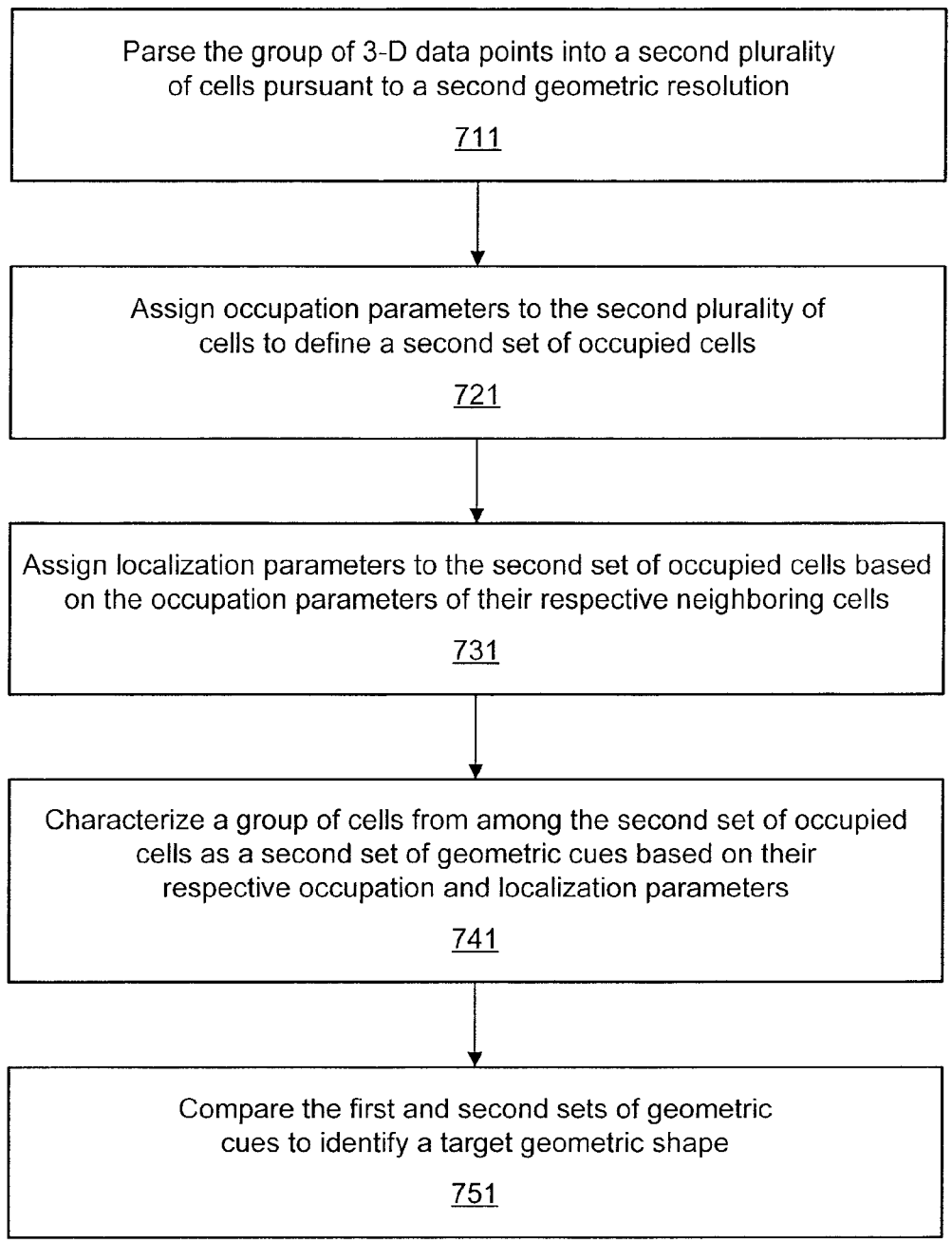

To illustrate, and with reference now to FIGS. 7A-B, first and second iterations 700, 701 of a third exemplary grammar-based, cueing method of object recognition in accordance with an embodiment is shown. In particular, as shown in FIG. 7A, first iteration 700 includes defining different geometric resolutions each measured in cells per unit area 710, parsing a group of 3-D data points into a first plurality of cells pursuant to a first geometric resolution 720, assigning occupation parameters to the first plurality of cells to define a first set of occupied cells 730, and assigning localization parameters to the first set of occupied cells based on the occupation parameters of their respective neighboring cells 740. First iteration 700 also includes characterizing a group of cells from among the first set of occupied cells as a first set of geometric cues based on their respective occupation and localization parameters 750, and storing the first set of geometric cues 760.

With reference now to FIG. 3B, second iteration 701 includes parsing the group of 3-D data points into a second plurality of cells pursuant to a second geometric resolution 711, assigning occupation parameters to the second plurality of cells to define a second set of occupied cells 721, and assigning localization parameters to the second set of occupied cells based on the occupation parameters of their respective neighboring cells 731. Additionally, second iteration 701 includes characterizing a group of cells from among the second set of occupied cells as a second set of geometric cues based on their respective occupation and localization parameters 741, and comparing the first and second sets of geometric cues to identify a target geometric shape 751.

To further illustrate, when attempting to recognize power lines with multiple wires/cables, the same grammar (with the same set of input parameters) may be applied to different implicit geometry resolutions, and the results are then aggregated. For closely spaced, parallel power lines, there can be either a single wire cue condition detected (e.g. at coarse resolution) or many wire cue conditions detected corresponding to each individual wire strand (e.g. at a higher resolution). At an intermediate resolution, the topology may be an indeterminate, oddly shaped "strip" element, which does not meet the wire cue condition. Since overhead power lines and other wire cued objects may hang in the form of tapering catenaries, which may be positioned either relatively close together or relatively far apart, it may be useful to aggregate the wire cue condition indications from more than one resolution into a single implicit representation.

In the implicit geometry representation, in contrast to the explicit geometry representation, the "singleness" or "multiplicity' of a geometry's representation depends on the dynamic sampling resolution, which may be selected, for example, by a user or an implemented application. In an embodiment, the multiplicity of objects depends on resolution (e.g., the "Coastline" problem). Different power lines may be sized and positioned in accordance with different configurations, and may be more easily detect at different resolutions. Thus, pursuant to an embodiment, a multi-resolution cueing approach is implemented to handle the complex wire assemblies that may occur. Accordingly, for multiple power line assemblies that vary in internal spacing either vertically, horizontally, or both, at near the implicit geometry sampling resolution ranges (e.g. 30 centimeters-1.5 meters), the cues are aggregated by stepping over a series of resolutions spanning the desired spacing ranges.

Cue Validation

With reference again to the embodiment illustrated in FIG. 2, after the cues are generated and integrated, the cues are validated by validation module 240 during a cue validation process. In one embodiment, method 100 includes evaluating a consistency between signal amplitudes corresponding to different 3-D data points within said geometric cues to either validate or disqualify said geometric cues To illustrate, if a scanned structure is made of a specific material, it is more likely than not that distinct surface points along the structure will reflect probing signals at similar intensities. Thus, in accordance with an embodiment, the reflected signal intensities associated with different data points, which have been flagged as geometric cues, in a potential object of interest are compared to determine if such object should be validated.

The foregoing notwithstanding, pursuant to one exemplary implementation, method 100 includes evaluating a difference between a first signal amplitude corresponding to a 3-D data point within one of said geometric cues and a second signal amplitude corresponding to a 3-D data point outside of said geometric cues to either validate or disqualify said geometric cues. In this manner, both the signal amplitudes of the geometric cues and their surrounding environment may be analyzed in tandem to provide additional contextual information.

Furthermore, in an embodiment, method 100 includes accessing a database of known object positions, such as knowledge database 261 shown in FIG. 2, and validating or disqualifying said geometric cues based on one or more of said known object positions. Consider the example where knowledge database 261 stores information that includes known identities and locations of various objects within a specific geometric area, such as trees and buildings. This contextual information is compared during a validation process with a group of integrated data cues to determine, for example, that a recognized shape associated with a grouping of cues is not to be categorized as an object of interest because of an apparent conflict regarding the positioning of such cues and the known positioning data that was obtained from knowledge database 261. Alternatively, if no such conflict exists, the grouping of cues is validated and a recognized object associated with such cues is identified.

Thus, pursuant to an exemplary implementation, a validation process is implemented to access the size and positioning information corresponding to a number of known objects, such as buildings and trees. The intensity signal associated with an input point cloud and the compiled contextual information are then compared to ensure that the detected objects, such as a number of linear segments that may represent power lines in a scene, are not false alarms stemming from buildings or vegetation. In this manner, an embodiment involves a redundant consistency check that uses an intensity signal, such as a LIDAR intensity signal, as well as available contextual information to mitigate false alarms, which serves to increase the robustness and effectiveness of the present technology.

Shape Identification/Object Recognition

With reference again to FIG. 1, method 100 includes characterizing a plurality of said occupied cells as geometric cues based on their respective occupation and localization parameters 140, and identifying a target geometric shape associated with said geometric cues 150. In an embodiment, method 100 also includes defining an object formed by the plurality of occupied cells as a result of the identifying of the target geometric shape.

For example, once a grouping of cues has been validated, the validated group of cues may then be output as a recognized object, such as by converting the group of cues into a line format. Thus, in the event that the objects of interest are linear segments, such as when the process is being used to identify power lines in a scene, the surviving linear segments are converted into line object reports.

In an embodiment, method 100 includes identifying multiple distinct linear segments formed by groups of occupied cells, measuring a physical proximity and an alignment of the linear segments with respect to one another, performing an analysis of the physical proximity and the alignment, and combining the linear segments into a single linear segment based on the analysis. Additionally, in one embodiment, the alignment is measured by determining geometric slopes and/or curves associated with the linear segments, identifying a set of complementary slopes and/or curves by performing a comparison of the geometric slopes and/or curves associated with the linear segments, and combining the linear segments into the single linear segment based on the identifying of the set of complementary slopes and/or curves.

For example, line segments that are in relatively close proximity with one another, which may even be overlapping one another, are combined if the slopes or curves of their major axes are substantially aligned or complementary. Additionally, in an embodiment, line segments are combined if their slopes or curves of their major axes are substantially aligned along a same reference axis within the x-y plane on which the data has been projected.

Figure 8A:
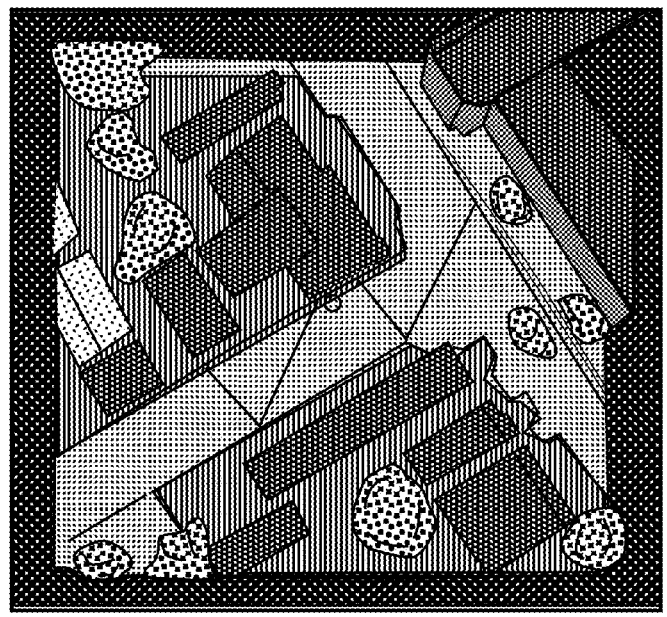
FIGS. 8A-F illustrate an exemplary object recognition process in accordance with an embodiment.
Figure 8B:
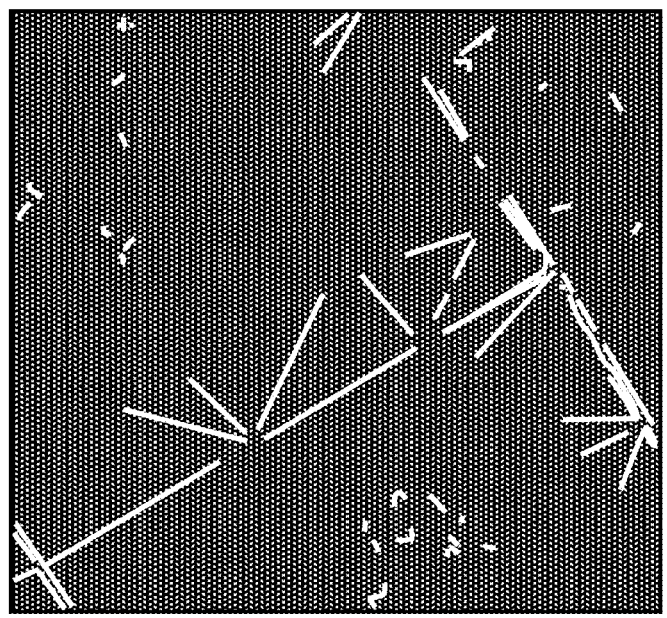
Figure 8C:
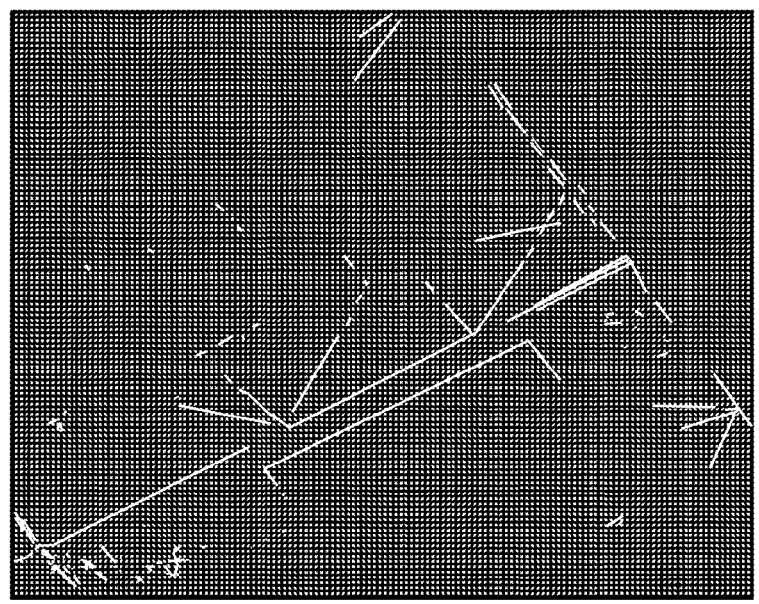
Figure 8D:
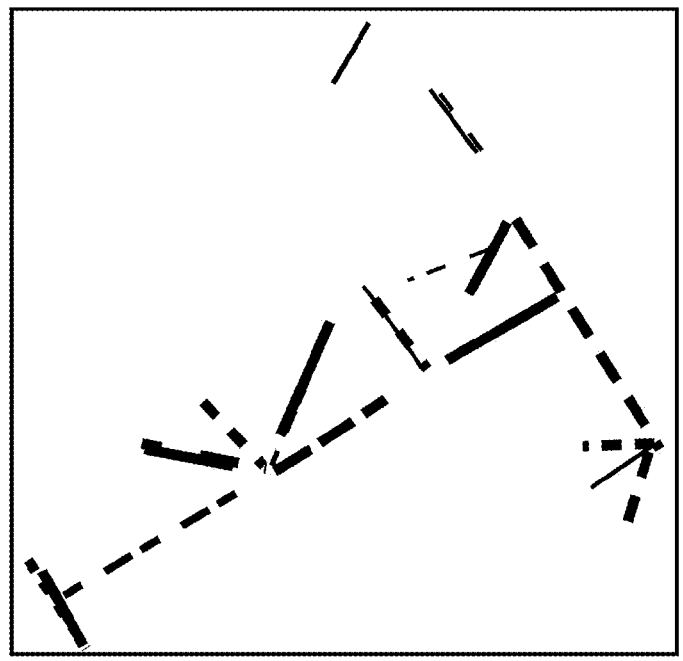
Figure 8E:
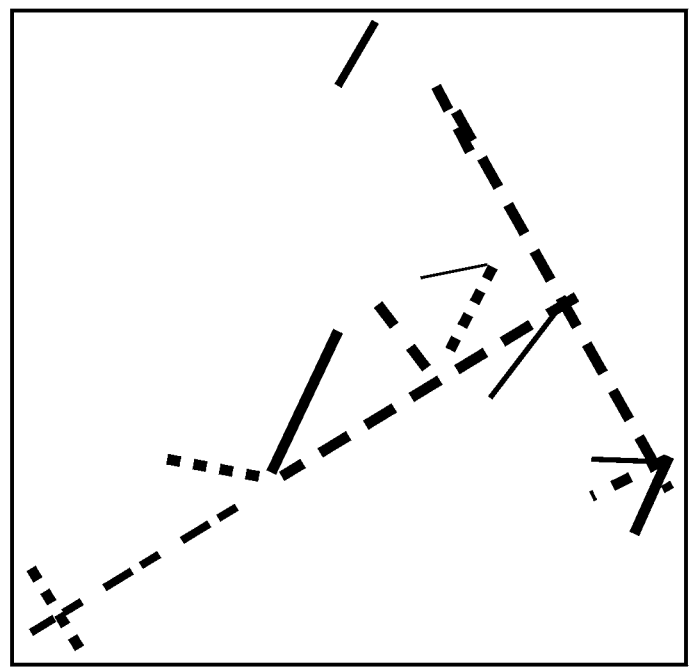
Figure 8F:
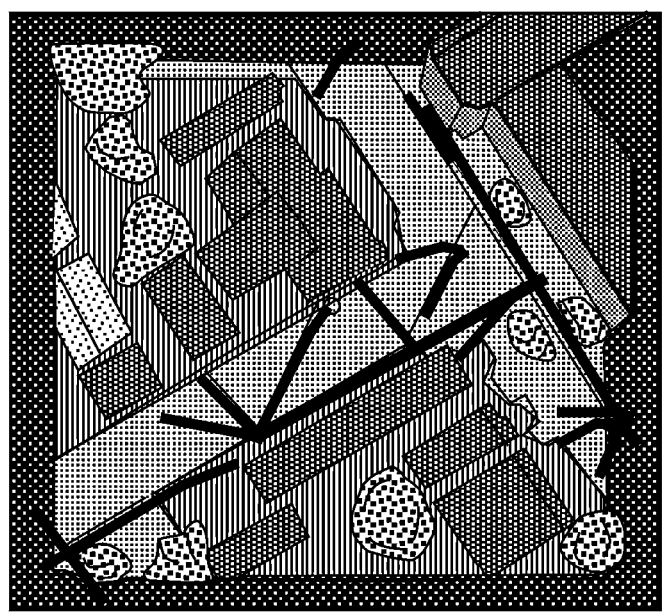

To further illustrate, and with reference now to FIGS. 8A-F, an exemplary object recognition process in accordance with an embodiment is shown. In particular, FIGS. 8A-F illustrate the generation of exemplary power line detection results on Ottawa Tile 198. FIG. 8A is a top-down or plan view of Tile 198, and FIG. 8B illustrates a projection onto an x-y plane of the implicit geometry-based wire cueing results. FIG. 8C illustrates filtered LIDAR intensity signal data, and FIG. 8D illustrates results of the use of a probabilistic Hough transform to identify linear segments, which may be used to identify a target geometric shape associated with the geometric cues 150 in method 100. FIG. 8E illustrates integrated linear segments based on line coherence criteria, wherein such a line coherence criteria may also be used to identify a target geometric shape associated with the geometric cues 150 in method 100, and FIG. 8F illustrates detected power lines overlaid on the actual data point cloud.

To further illustrate this process, it is noted that the detected wire cues may still have a number of false alarms (e.g., false positives indicating cells that are incorrectly labeled as a part of a wire) that are to be pruned. In an embodiment, a multi-pronged strategy is implemented to reduce these false alarms while maintaining the detection rate. For example, when scanning for linear objects using a LIDAR sensor, the following three complimentary approaches may be implemented to reduce false alarms: a) using the LIDAR intensity signal, b) using the building and vegetation detector, if available, and c) refining the wire cues that have been detected. It is noted that the LIDAR intensity signal may yield a relatively clear signature from power lines and wires that can be extracted fairly easily by implementing a processing paradigm that incorporates an appropriate set of grammar rules, such as disclosed herein.

An example of the filtered LIDAR signal, with the intensity values outside a threshold range and outside a height range being removed, is shown in FIG. 8C. FIG. 8C shows the filtered intensity signal corresponding to the data in FIG. 8A. The height range is computed by first finding a bare ground profile of the region. In an exemplary implementation, however, the filtered LIDAR intensity signal still has some responses from building walls and vegetation areas. The second false alarm mitigation approach uses building and vegetation reports obtained by running automatic feature extraction tools, such as automatic feature extraction tools 260 shown in FIG. 2, on the data. The presence of these objects provides further contextual data to prune out the power line segments that are not plausible. The results of the two approaches mentioned above are then fed as input to validation module 240.

In one embodiment, a third approach is implemented to reducing false alarms to operate on the created image by projecting wire cues into a two-dimensional (2-D) plane. On the projected cue image, a component labeling is performed that groups the detected cues based on their "4" or "8" neighborhood. The resulting blobs or groups of points are then filtered based on their area and perimeter attributes. The goal in this step is to prune out regions that are too small, too large, noisy patches, or do not have wire-like attributes. In an embodiment, the resulting cues are then passed on to integration module 230 which uses a probabilistic Hough transform to integrate the different cues into coherent line segments. The probabilistic Hough transform is equivalent to computing the Hough Transform of a sub-sampled version of the detected cues. These cues are randomly chosen from a uniform probability density function defined over the domain of the cues. This process results in multiple line segments of varying lengths to be reported.

An example of an integration of the cues into line segments is shown in FIG. 8D. It is shown that several of the detected lines overlap and that multiple line segments may be yielded for each true line segment. An additional stage is then implemented to consolidate the line segments into unique line segments that are to be validated and reported. The line segments are agglomerated using minimum distance and minimum angle criteria such that contiguous and piece-wise segments are clustered into complete line segments. Examples of the line segments that are detected using this approach are shown in FIG. 8E and are also shown overlaid on the original data in FIG. 8F.

Figure 9A:
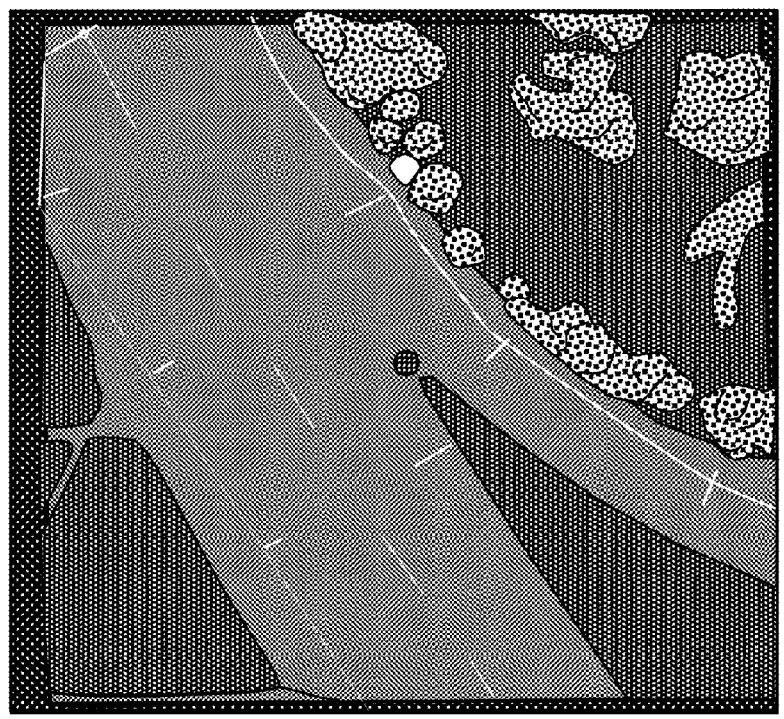
FIGS. 9A-B illustrate exemplary power line detection results in accordance with an embodiment.
Figure 9B:
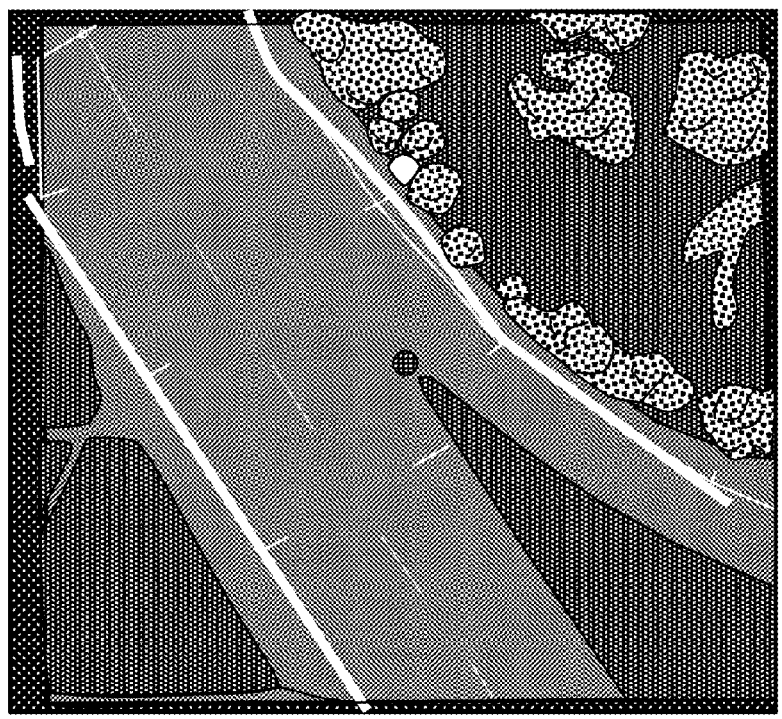

In addition to the foregoing, further exemplary results of detected wire cues using a multi-resolution approach are shown in FIGS. 9A-10B. With reference now to FIGS. 9A-B, exemplary power line detection results in accordance with an embodiment is shown, wherein FIG. 9A shows a top-down or plan view of acquired data and FIG. 9B shows detected power lines overlaid on the actual data point cloud.

Figure 10A:
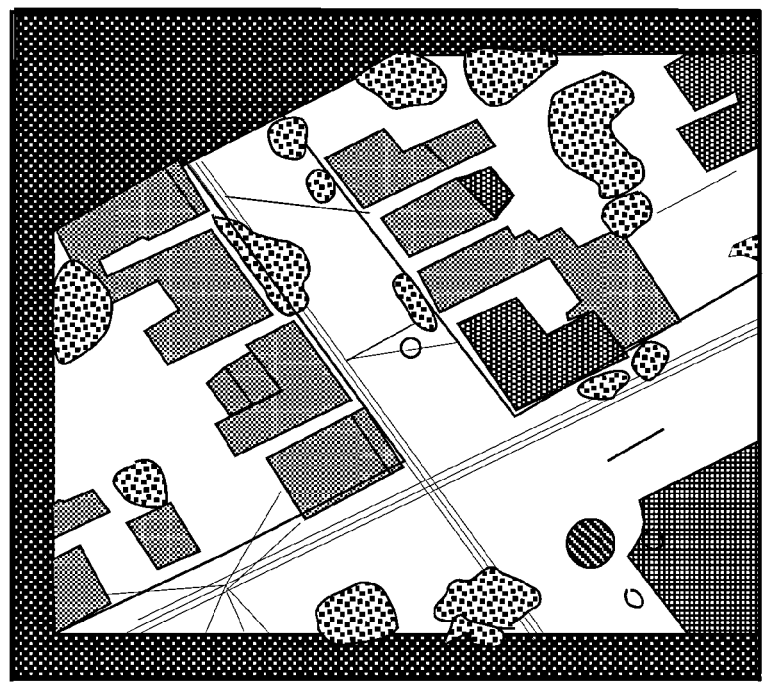
FIGS. 10A-B illustrate exemplary power line detection results in accordance with an embodiment.
Figure 10B:
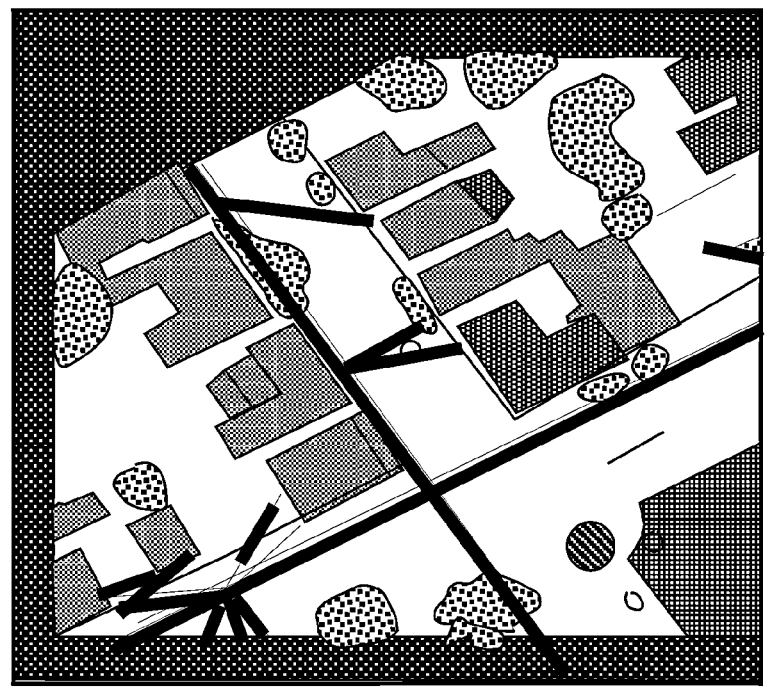
Figure 11A:
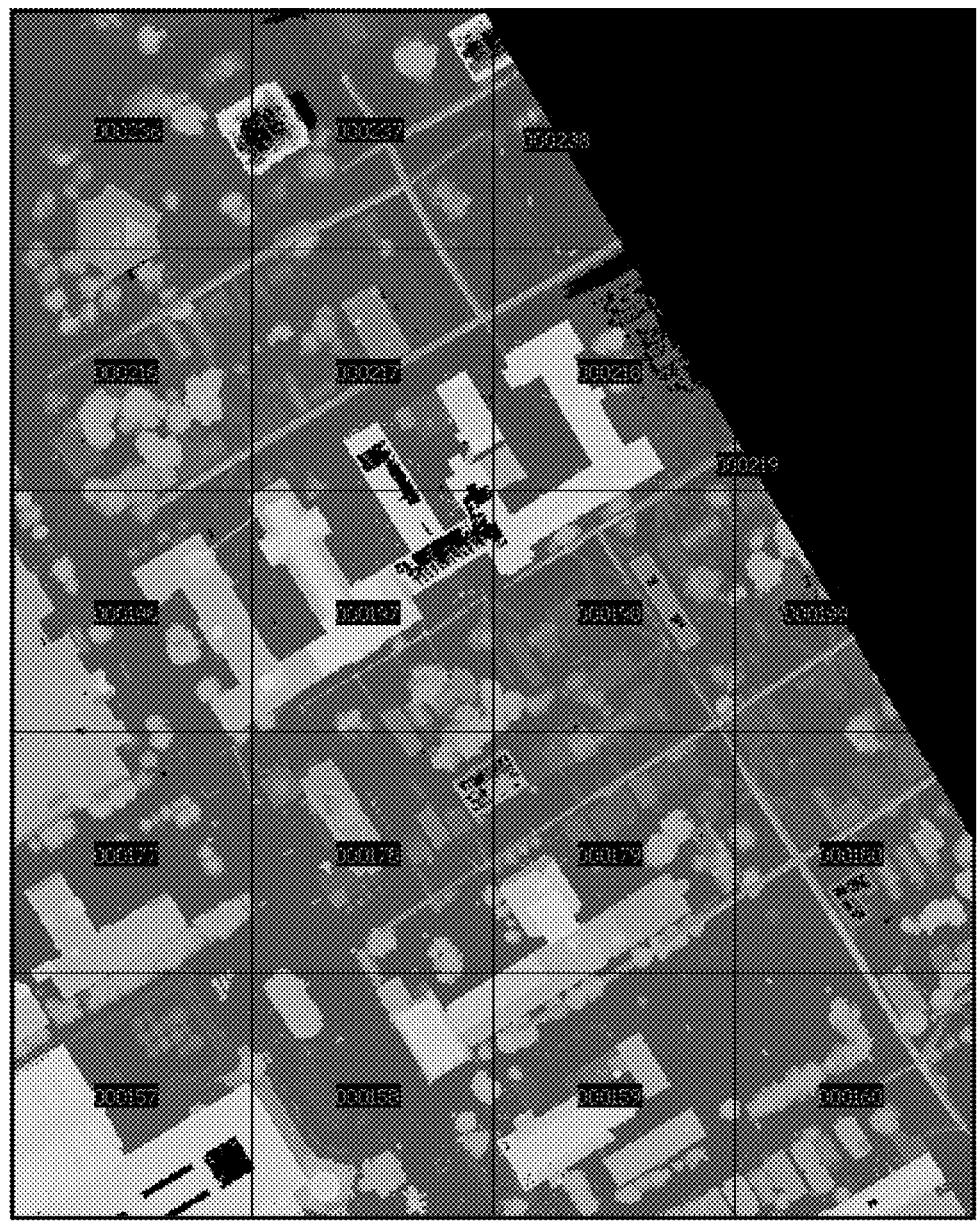
FIGS. 11A-E illustrate exemplary grids associated with a number of detected linear objects in accordance with an embodiment.
Figure 11B:
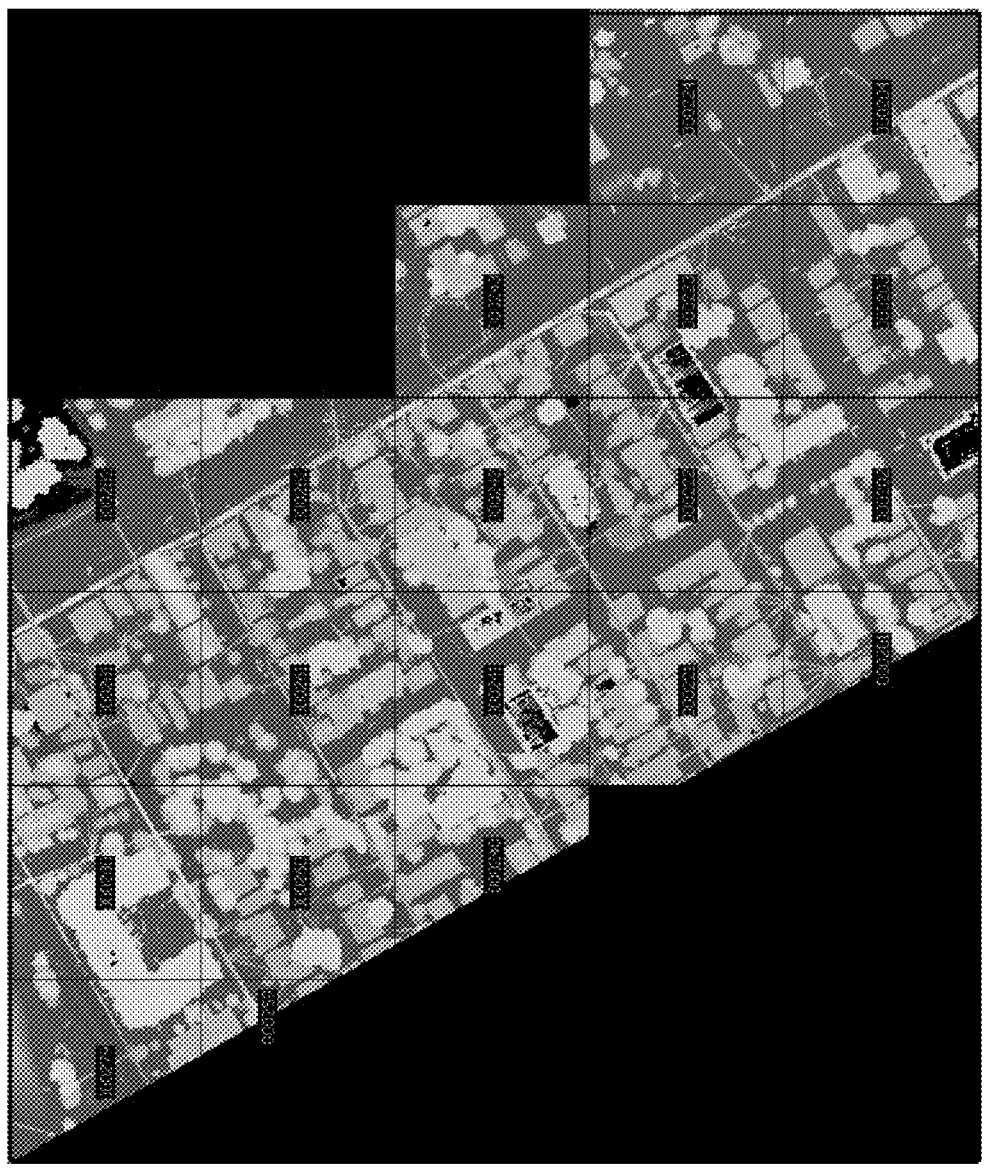
Figure 11C:
Figure 11D:
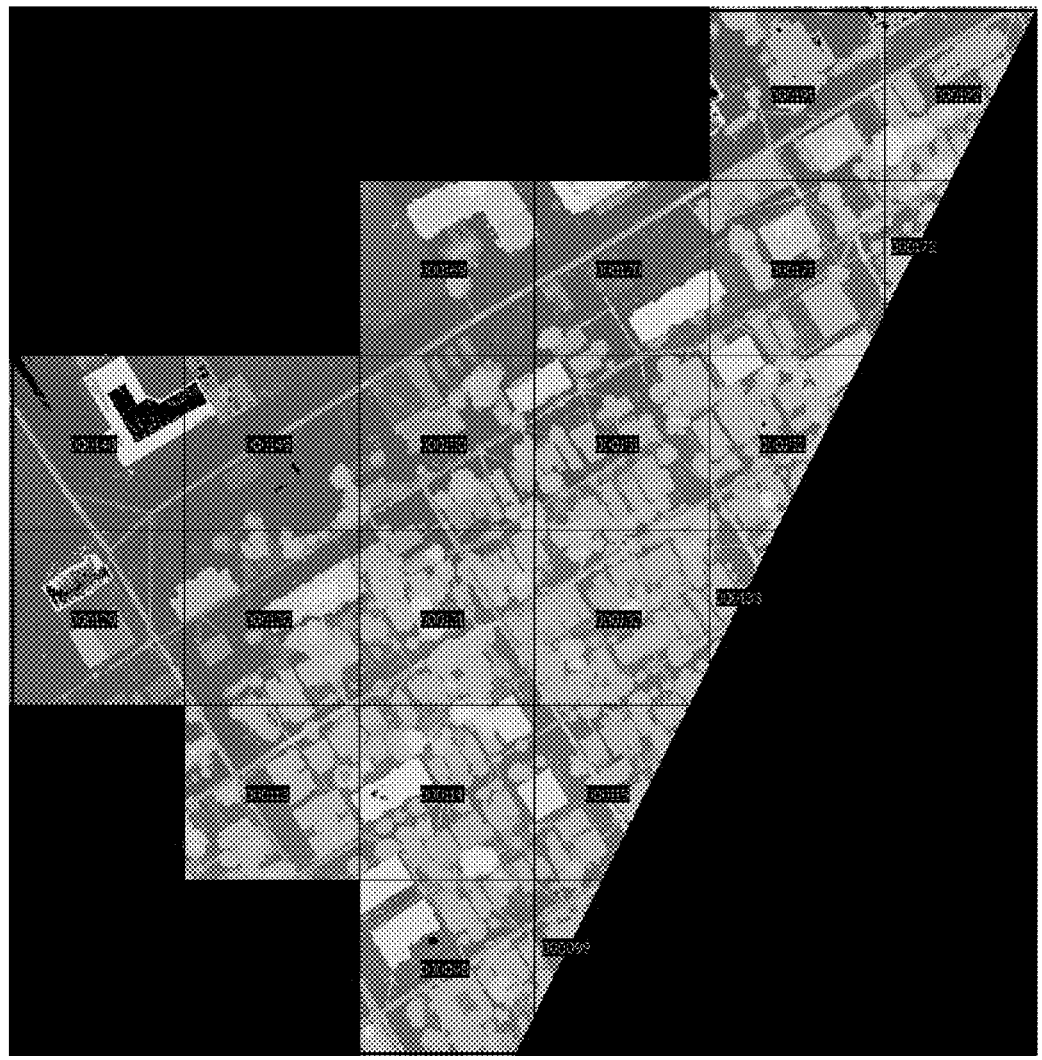
Figure 11E:
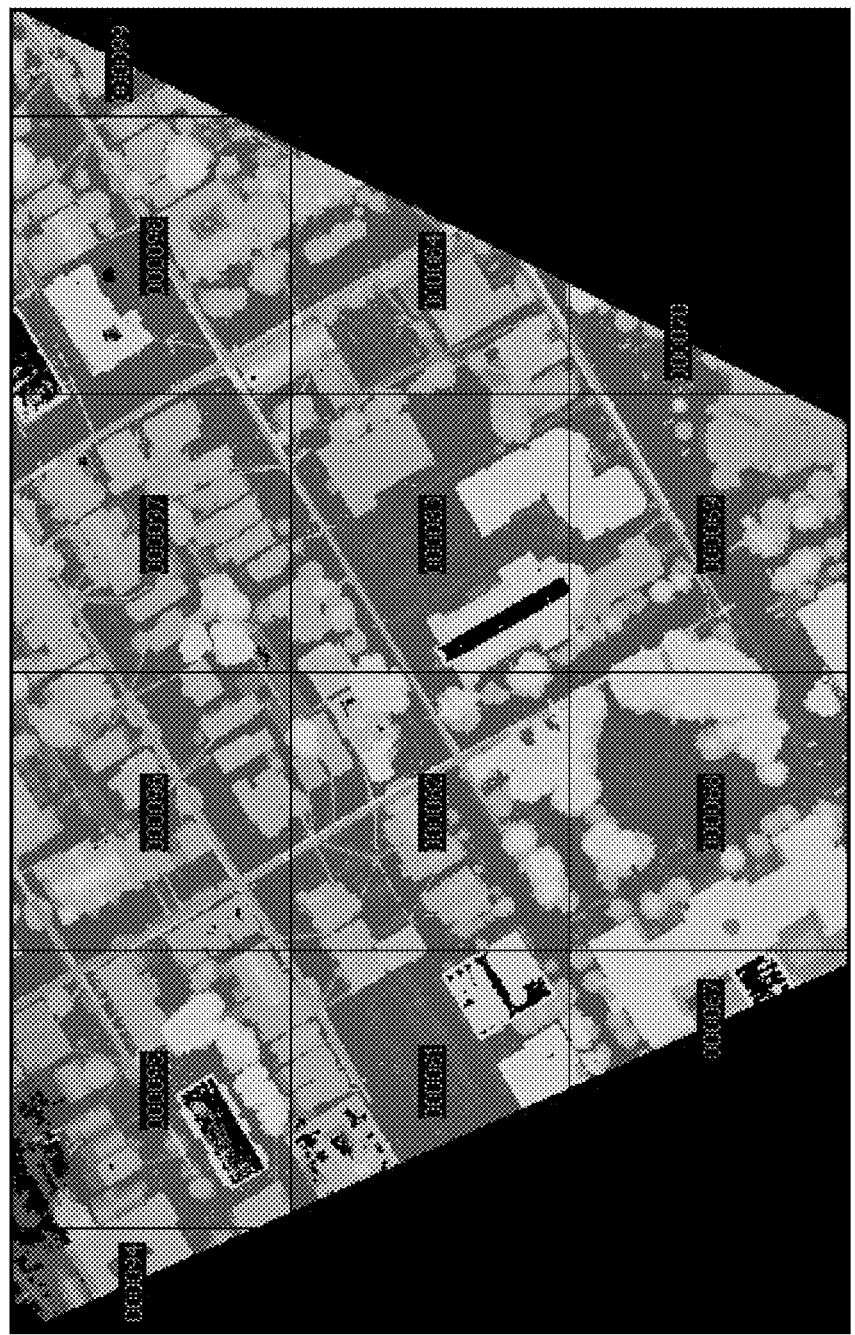

Similarly, and with reference now to FIGS. 10A-B, an additional set of exemplary power line detection results in accordance with an embodiment is shown, wherein FIG. 10A shows a top-down or plan view of acquired data and FIG. 10B shows detected power lines overlaid on the actual data point cloud.

With reference now to FIGS. 11A-E, exemplary grids associated with a number of detected linear objects in accordance with an embodiment are shown. In particular, FIGS. 11A-E illustrate detected power line grids in the Ottawa down town area, wherein these results depict aerial views of point clouds overlaid with a number of detected power lines. The collected Ottawa LIDAR data was processed in batches of 20 tiles and the results are shown in FIGS. 11A-E. In each of FIGS. 11A-E, the orthographic view of the input tile with the detected wires overlaid in the scene is shown. The illustrated results demonstrate that the power line grid structures in Ottawa can be robustly detected using LIDAR data in accordance with various embodiments of the present technology.

Exemplary Computer System Environment

In an embodiment, a method as disclosed herein, or portion thereof, is executed using a computer system. Indeed, in accordance with one embodiment, instructions are stored on a computer-readable medium, wherein the instructions when executed cause a computer system to perform a particular method, or a portion thereof, such as disclosed herein.

Reference will now be made to an exemplary computer system environment, wherein such environment is configured to be adapted so as to store and/or execute a set of computer-executable instructions. However, other computer system environments may also be implemented within the spirit and scope of the present technology.

Figure 12:
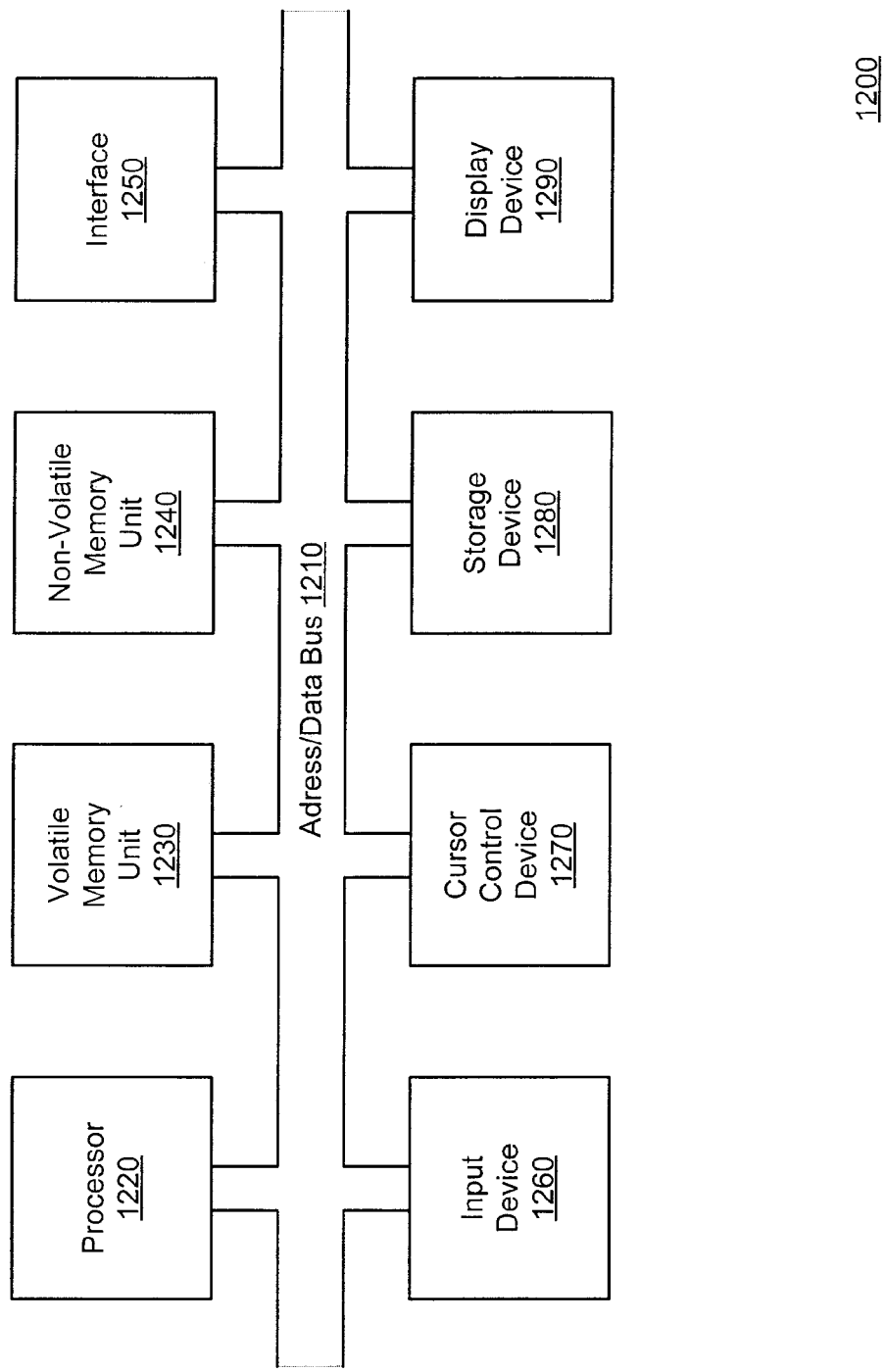
FIG. 12 is a block diagram of an exemplary computer system in accordance with an embodiment.

With reference now to FIG. 12, an exemplary computer system 1200 in accordance with an embodiment is shown. Exemplary computer system 1200 is configured to perform calculations, processes, operations, and/or functions associated with a program or algorithm. In one embodiment, certain processes and steps discussed herein are realized as a series of instructions (e.g., software program) that reside within computer readable memory units and are executed by one or more processors of exemplary computer system 1200. When executed, the instructions cause exemplary computer system 1200 to perform specific actions and exhibit specific behavior, such as described herein.

With reference still to FIG. 12, exemplary computer system 1200 includes an address/data bus 1210 that is configured to communicating information. Additionally, one or more data processing unit, such as processor 1220, are coupled with address/data bus 1210. Processor 1220 is configured to process information and instructions. In an embodiment, processor 1220 is a microprocessor. Alternatively, processor 1220 may be a different type of processor.

Exemplary computer system 1200 is configured to utilize one or more data storage units. With reference still the embodiment illustrated in FIG. 12, exemplary computer system 1200 includes a volatile memory unit 1230 (e.g., random access memory ("RAM"), static RAM, dynamic RAM, etc.) coupled with address/data bus 1210, wherein volatile memory unit 1230 is configured to store information and instructions for processor 1220. Exemplary computer system 1200 further includes a non-volatile memory unit 1240 (e.g., read-only memory ("ROM"), programmable ROM ("PROM"), erasable programmable ROM ("EPROM"), electrically erasable programmable ROM "EEPROM"), flash memory, etc.) coupled with address/data bus 1210, wherein non-volatile memory unit 1240 is configured to store static information and instructions for processor 1220.

In an embodiment, exemplary computer system 1200 also includes one or more interfaces, such as interface 1250, coupled with address/data bus 1210. The one or more interfaces are configured to enable exemplary computer system 1200 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one embodiment, exemplary computer system 1200 includes an input device 1260 coupled with address/data bus 1210, wherein input device 1260 is configured to communicate information and command selections to processor 1220. In accordance with one embodiment, input device 1260 is an alphanumeric input device, such as a keyboard, that includes alphanumeric and/or function keys. Alternatively, input device 1260 may be an input device other than an alphanumeric input device.

In an embodiment, exemplary computer system 1200 includes a cursor control device 1270 coupled with address/data bus 1210, wherein cursor control device 1270 is configured to communicate user input information and/or command selections to processor 1220. In an embodiment, cursor control device 1270 is implemented using a device such as a mouse, a track-ball, a track-pad, an optical tracking device, or a touch screen.

The foregoing notwithstanding, in an embodiment, cursor control device 1270 is directed and/or activated via input from input device 1260, such as in response to the use of special keys and key sequence commands associated with input device 1260. In an alternative embodiment, cursor control device 1270 is configured to be directed or guided by voice commands.

In an embodiment, exemplary computer system 1200 further includes one or more optional computer usable data storage devices, such as storage device 1280, coupled with address/data bus 1210. Storage device 1280 is configured to store information and/or computer executable instructions. In one embodiment, storage device 1280 is a storage device such as a magnetic or optical disk drive (e.g., hard disk drive ("HDD"), floppy diskette, compact disk read only memory ("CD-ROM"), digital versatile disk ("DVD")).

Pursuant to one embodiment, a display device 1290 is coupled with address/data bus 1210, wherein display device 1290 is configured to display video and/or graphics. In an embodiment, display device 1290 includes a cathode ray tube ("CRT"), liquid crystal display ("LCD"), field emission display ("FED"), plasma display or any other display device suitable for displaying video and/or graphic images and alphanumeric characters recognizable to a user.

Exemplary computer system 1200 is presented herein as an exemplary computing environment in accordance with an embodiment. However, exemplary computer system 1200 is not strictly limited to being a computer system. For example, an embodiment provides that exemplary computer system 1200 represents a type of data processing analysis that may be used in accordance with various embodiments described herein. Moreover, other computing systems may also be implemented. Indeed, the spirit and scope of the present technology is not limited to any single data processing environment.

Thus, in an embodiment, one or more operations of various embodiments of the present technology are controlled or implemented using computer-executable instructions, such as program modules, being executed by a computer. In one exemplary implementation, such program modules include routines, programs, objects, components and/or data structures that are configured to perform particular tasks or implement particular abstract data types.

In addition, an embodiment provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Summary Concepts

It is noted that the foregoing discussion has presented at least the following concepts:

1. A grammar-based, cueing method of object recognition, the method including or comprising:

accessing cells that define a portion of a three-dimensional (3-D) scene;

assigning occupation parameters to the cells to define a plurality of occupied cells and at least one vacant cell;

assigning localization parameters to the occupied cells based on the occupation parameters of their respective neighboring cells;

characterizing a plurality of the occupied cells as geometric cues based on their respective occupation and localization parameters; and identifying a target geometric shape associated with the geometric cues.

2. The method of Concept 1, further including or comprising:

generating 3-D data points that define discrete points in the portion of the 3-D scene; and parsing the 3-D data points to define the cells, each of the cells including or comprising a plurality of the 3-D data points associated with one or more altitude values and one or more signal amplitudes.

3. The method of Concept 2, further including or comprising:

utilizing a sensor to scan a geographical area and return data values corresponding to the geographical area; and generating the 3-D data points based on the returned data values.

4. The method of Concept 3, further including or comprising:

selecting the sensor from among a group of scanning devices consisting essentially of a light detection and ranging (LIDAR) sensor, a laser scanner and a stereo imager.

5. The method of Concept 2, further including or comprising:

defining different geometric resolutions each measured in cells per unit area;

parsing the 3-D data points into a first plurality of cells pursuant to a first geometric resolution;

assigning occupation parameters to the first plurality of cells to define a first set of occupied cells;

assigning localization parameters to the first set of occupied cells based on the occupation parameters of their respective neighboring cells;

characterizing a group of cells from among the first set of occupied cells as a first set of geometric cues based on their respective occupation and localization parameters; and storing the first set of geometric cues.

6. The method of Concept 5, further including or comprising:

parsing the 3-D data points into a second plurality of cells pursuant to a second geometric resolution;

assigning occupation parameters to the second plurality of cells to define a second set of occupied cells;

assigning localization parameters to the second set of occupied cells based on the occupation parameters of their respective neighboring cells;

characterizing a group of cells from among the second set of occupied cells as a second set of geometric cues based on their respective occupation and localization parameters; and comparing the first and second sets of geometric cues to identify a target geometric shape.

7. The method of Concept 2, wherein the assigning of the occupation parameters comprises:

defining implicit geometry values associated with the cells; and assigning an occupation parameter to each of the cells based on the cell's respective implicit geometry value to define the cell as occupied or vacant.

8. The method of Concept 7, wherein the defining of the implicit geometry values comprises:

defining an implicit geometry value associated with each cell by counting a number of 3-D data points within the cell that are associated with one or more altitude values equal to or above a preselected altitude threshold.

9. The method of Concept 7, wherein the defining of the implicit geometry values comprises:

defining an implicit geometry value associated with each cell by evaluating one or more signal amplitudes associated with 3-D data points within the cell.

10. The method of Concept 2, further including or comprising:

defining an object formed by the plurality of occupied cells as a result of the identifying of the target geometric shape.

11. The method of Concept 2, further including or comprising:

evaluating a consistency between signal amplitudes corresponding to different 3-D data points within the geometric cues to either validate or disqualify the geometric cues.

12. The method of Concept 2, further including or comprising:

evaluating a difference between a first signal amplitude corresponding to a 3-D data point within one of the geometric cues and a second signal amplitude corresponding to a 3-D data point outside of the geometric cues to either validate or disqualify the geometric cues.

13. The method of Concept 2, further including or comprising:

accessing a database of known object positions; and validating or disqualifying the geometric cues based on one or more of the known object positions.

14. The method of Concept 1, further including or comprising:

associating a near neighborhood and a plurality of far neighborhoods with a subject cell from among the cells;

performing a grammar evaluation of the subject cell based on the occupation parameters of the subject cell and each cell within the near and far neighborhoods; and determining whether the subject cell is to be characterized as a geometric cue based on the grammar evaluation.

15. The method of Concept 14, wherein the performing of the grammar evaluation comprises:

determining whether a subject cell from among the cells is occupied;

determining whether every cell within two juxtaposed neighborhoods from among the far neighborhoods are vacant;

evaluating a total number of occupied cells within the near neighborhood;

determining whether the near neighborhood includes or comprises two or more separated vacant regions; and characterizing the subject cell as a geometric cue if:

1) the subject cell is occupied;

2) every cell within the two juxtaposed neighborhoods is vacant;

3) the total number of occupied cells within the near neighborhood is within a preselected range; and 4) the near neighborhood includes or comprises two or more separated vacant regions.

16. The method of Concept 1, wherein the identifying of the target geometric shape comprises:

identifying multiple distinct linear segments formed by groups of occupied cells;

measuring a physical proximity and an alignment of the linear segments with respect to one another;

performing an analysis of the physical proximity and the alignment;

combining the linear segments into a single linear segment based on the analysis.

17. The method of Concept 16, wherein the measuring of the alignment comprises:

determining geometric slopes and/or curves associated with the linear segments;

identifying a set of complementary slopes and/or curves by performing a comparison of the geometric slopes and/or curves associated with the linear segments; and combining the linear segments into the single linear segment based on the identifying of the set of complementary slopes and/or curves.

18. A computer-readable medium that stores a set of instructions that when executed cause a computer system to implement the method of Concept 1.

19. A grammar-based, cueing method of object recognition, the method including or comprising:

accessing three-dimensional (3-D) data points associated with a 3-D scene and corresponding to different altitude values;

filtering a first group of the 3-D data points corresponding to one or more altitude values above a preselected altitude threshold from a second group of the 3-D data points associated with one or more different altitude values at or below the preselected altitude threshold;

identifying a target geometric shape associated with a plurality of data points from among the first group of 3-D data points; and defining an object formed by the plurality of data points as a result of the identifying of the target geometric shape.

20. A computer-readable medium that stores a set of instructions that when executed cause a computer system to implement the method of Concept 19.

21. A grammar-based, cueing method of object recognition, the method including or comprising:

defining different geometric resolutions each measured in cells per unit area;

parsing a group of three-dimensional (3-D) data points into a first plurality of cells pursuant to a first geometric resolution;

assigning occupation parameters to the first plurality of cells to define a first set of occupied cells;

assigning localization parameters to the first set of occupied cells based on the occupation parameters of their respective neighboring cells;

characterizing a group of cells from among the first set of occupied cells as a first set of geometric cues based on their respective occupation and localization parameters; and storing the first set of geometric cues.

22. The method of Concept 21, further including or comprising:

parsing the group of 3-D data points into a second plurality of cells pursuant to a second geometric resolution;

assigning occupation parameters to the second plurality of cells to define a second set of occupied cells;

assigning localization parameters to the second set of occupied cells based on the occupation parameters of their respective neighboring cells;

characterizing a group of cells from among the second set of occupied cells as a second set of geometric cues based on their respective occupation and localization parameters; and comparing the first and second sets of geometric cues to identify a target geometric shape.

23. A computer-readable medium that stores a set of instructions that when executed cause a computer system to implement the method of Concept 21.

24. A system for performing a grammar-based, cueing method of object recognition, the system including or comprising:

a cueing module configured to access cells that define a portion of a three-dimensional (3-D) scene, assign occupation parameters to the cells to define a plurality of occupied cells and at least one vacant cell, and assign localization parameters to the occupied cells based on the occupation parameters of their respective neighboring cells;

an integration module communicatively coupled or associated with the cueing module, the integration module configured to characterize a plurality of the occupied cells as geometric cues based on their respective occupation and localization parameters; and a validation module communicatively coupled or associated with the integration module, the validation module configured to identify a target geometric shape associated with the geometric cues.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A grammar-based, cueing method of object recognition, said method comprising:

accessing three-dimensional (3D) input data points collected by a sensor from a non-transitory computer readable medium;

converting the three-dimensional (3D) input data points into an implicit geometry by partitioning the three-dimensional (3D) input data points into a three-dimensional (3D) mesh of cells, the mesh having a resolution measured in cells per unit area;

assigning occupation parameters to said cells to define a plurality of occupied cells and at least one vacant cell;

assigning localization parameters to said occupied cells based on the occupation parameters of their respective neighboring cells;

characterizing a plurality of said occupied cells as geometric cues based on their respective occupation and localization parameters; and identifying a target geometric shape associated with said geometric cues.

2. The method of claim 1, further comprising:

generating 3-D data points that define discrete points in said portion of said three-dimensional (3D) input data points; and parsing said 3-D data points to define said cells, each of said cells including a plurality of said 3-D data points associated with one or more altitude values and one or more signal amplitudes.

3. The method of claim 2, further comprising:

utilizing a sensor to scan a geographical area and return data values corresponding to said geographical area; and generating said 3-D data points based on said returned data values.

4. The method of claim 3, further comprising:

selecting said sensor from among a group of scanning devices consisting essentially of a light detection and ranging (LIDAR) sensor, a laser scanner and a stereo imager.

5. The method of claim 1, further comprising:

defining different geometric resolutions each measured in cells per unit area;

parsing said 3-D data points into a first plurality of cells pursuant to a first geometric resolution;

assigning occupation parameters to said first plurality of cells to define a first set of occupied cells;

assigning localization parameters to said first set of occupied cells based on the occupation parameters of their respective neighboring cells;

characterizing a group of cells from among said first set of occupied cells as a first set of geometric cues based on their respective occupation and localization parameters; and storing said first set of geometric cues.

6. The method of claim 5, further comprising:
parsing said 3-D data points into a second plurality of cells pursuant to a second geometric resolution;
assigning occupation parameters to said second plurality of cells to define a second set of occupied cells;
assigning localization parameters to said second set of occupied cells based on the occupation parameters of their respective neighboring cells;
characterizing a group of cells from among said second set of occupied cells as a second set of geometric cues based on their respective occupation and localization parameters; and
comparing said first and second sets of geometric cues to identify a target geometric shape.

7. The method of claim 1, wherein said assigning of said occupation parameters comprises:
defining implicit geometry values associated with said cells; and
assigning an occupation parameter to each of said cells based on the cell's respective implicit geometry value to define the cell as occupied or vacant.

8. The method of claim 7, wherein said defining of said implicit geometry values comprises:
defining an implicit geometry value associated with each cell by counting a number of 3-D data points within said cell that are associated with one or more altitude values equal to or above a preselected altitude threshold.

9. The method of claim 7, wherein said defining of said implicit geometry values comprises:
defining an implicit geometry value associated with each cell by evaluating one or more signal amplitudes associated with 3-D data points within said cell.

10. The method of claim 1, further comprising:
defining an object formed by said plurality of occupied cells as a result of said identifying of said target geometric shape.

11. The method of claim 1, further comprising:
evaluating a consistency between signal amplitudes corresponding to different 3-D data points within said geometric cues to either validate or disqualify said geometric cues.

12. The method of claim 1, further comprising:
evaluating a difference between a first signal amplitude corresponding to a 3-D data point within one of said geometric cues and a second signal amplitude corresponding to a 3-D data point outside of said geometric cues to either validate or disqualify said geometric cues.

13. The method of claim 1, further comprising:
accessing a database of known object positions; and
validating or disqualifying said geometric cues based on one or more of said known object positions.

14. The method of claim 1, further comprising:
associating a near neighborhood and a plurality of far neighborhoods with a subject cell from among said cells;
performing a grammar evaluation of the subject cell based on the occupation parameters of the subject cell and each cell within the near and far neighborhoods; and
determining whether the subject cell is to be characterized as a geometric cue based on said grammar evaluation.

15. The method of claim 14, wherein said performing of said grammar evaluation comprises:
determining whether a subject cell from among said cells is occupied;
determining whether every cell within two juxtaposed neighborhoods from among the far neighborhoods are vacant;
evaluating a total number of occupied cells within the near neighborhood;
determining whether the near neighborhood includes two or more separated vacant regions; and
characterizing the subject cell as a geometric cue if:
1) the subject cell is occupied;
2) every cell within the two juxtaposed neighborhoods is vacant;
3) the total number of occupied cells within the near neighborhood is within a preselected range; and
4) the near neighborhood includes two or more separated vacant regions.

16. The method of claim 1, wherein said identifying of said target geometric shape comprises:
identifying multiple distinct linear segments formed by groups of occupied cells;
measuring a physical proximity and an alignment of said linear segments with respect to one another;
performing an analysis of said physical proximity and said alignment;
combining said linear segments into a single linear segment based on said analysis.

17. The method of claim 16, wherein said measuring of said alignment comprises:
determining geometric slopes and/or curves associated with said linear segments;
identifying a set of complementary slopes and/or curves by performing a comparison of the geometric slopes and/or curves associated with said linear segments; and
combining said linear segments into said single linear segment based on said identifying of the set of complementary slopes and/or curves.

18. A non-transitory computer-readable medium that stores a set of instructions that when executed cause a computer system to implement the method of claim 1.

19. A grammar-based, cueing method of object recognition, said method comprising:
accessing three-dimensional (3D) input data points collected by a sensor from a non-transitory computer readable medium, the three-dimensional (3D) input data points having different altitude values;
filtering a first group of said 3-D input data points corresponding to one or more altitude values above a preselected altitude threshold from a second group of said 3-D input data points associated with one or more different altitude values at or below said preselected altitude threshold;
converting the three-dimensional (3D) input data points in the first group into an implicit geometry by partitioning the three-dimensional (3D) input data points in the first group into a three-dimensional (3D) mesh of cells, the mesh having a resolution measured in cells per unit area;
assigning occupation parameters to said cells to define a plurality of occupied cells and at least one vacant cell;
assigning localization parameters to said occupied cells based on the occupation parameters of their respective neighboring cells;

characterizing a plurality of said occupied cells as geometric cues based on their respective occupation and localization parameters;
identifying a target geometric shape associated with said geometric cues; and
defining an object formed by said plurality of data points as a result of said identifying of said target geometric shape.

20. A non-transitory computer-readable medium that stores a set of instructions that when executed cause a computer system to implement the method of claim 19.

21. A grammar-based, cueing method of object recognition, said method comprising:
accessing three-dimensional (3D) input data points collected by a sensor from a non-transitory computer readable medium;
defining different geometric resolutions each measured in cells per unit area;
parsing the three-dimensional (3-D) input data points into a three-dimensional (3D) mesh of cells, the mesh having a first defined geometric resolution measured in cells per unit area;
assigning occupation parameters to said first plurality of cells to define a first set of occupied cells;
assigning localization parameters to said first set of occupied cells based on the occupation parameters of their respective neighboring cells;
characterizing a group of cells from among said first set of occupied cells as a first set of geometric cues based on their respective occupation and localization parameters; and
storing said first set of geometric cues.

22. The method of claim 21, further comprising:
parsing said group of 3-D data points into a second plurality of cells having a second defined geometric resolution measured in cells per unit area;
assigning occupation parameters to said second plurality of cells to define a second set of occupied cells;
assigning localization parameters to said second set of occupied cells based on the occupation parameters of their respective neighboring cells;
characterizing a group of cells from among said second set of occupied cells as a second set of geometric cues based on their respective occupation and localization parameters; and
comparing said first and second sets of geometric cues to identify a target geometric shape.

23. A non-transitory computer-readable medium that stores a set of instructions that when executed cause a computer system to implement the method of claim 21.

24. A system for performing a grammar-based, cueing method of object recognition, said system comprising:
a cueing module configured to access three-dimensional (3D) input data points collected by a sensor from a non-transitory computer readable medium, convert the three-dimensional (3D) input data points into an implicit geometry by partitioning the three-dimensional (3D) input data points into a three-dimensional (3D) mesh, the mesh having a resolution measured in cells per unit area, assign occupation parameters to said cells to define a plurality of occupied cells and at least one vacant cell, and assign localization parameters to said occupied cells based on the occupation parameters of their respective neighboring cells;
an integration module communicatively coupled or associated with said cueing module, said integration module configured to characterize a plurality of said occupied cells as geometric cues based on their respective occupation and localization parameters; and
a validation module communicatively coupled or associated with said integration module, said validation module configured to identify a target geometric shape associated with said geometric cues.

* * * * *